United States Patent
Zhou

(10) Patent No.: US 9,581,999 B2
(45) Date of Patent: Feb. 28, 2017

(54) PROPERTY PREVIEW DRONE SYSTEM AND METHOD

(71) Applicant: Wesley Zhou, Laguna Niguel, CA (US)

(72) Inventor: Wesley Zhou, Laguna Niguel, CA (US)

( * ) Notice: Subject to any disclaimer, the term of this patent is extended or adjusted under 35 U.S.C. 154(b) by 238 days.

(21) Appl. No.: 14/698,114

(22) Filed: Apr. 28, 2015

(65) Prior Publication Data

US 2016/0321503 A1 Nov. 3, 2016

(51) Int. Cl.

| | |
|---|---|
| *G05D 1/00* | (2006.01) |
| *G06K 9/00* | (2006.01) |
| *B64C 39/02* | (2006.01) |
| *G06Q 50/16* | (2012.01) |
| *H04N 7/18* | (2006.01) |
| *G01C 11/00* | (2006.01) |

(52) U.S. Cl.
CPC .......... *G05D 1/0011* (2013.01); *B64C 39/024* (2013.01); *G01C 11/00* (2013.01); *G05D 1/0061* (2013.01); *G06K 9/00637* (2013.01); *G06K 9/00711* (2013.01); *G06Q 50/16* (2013.01); *H04N 7/185* (2013.01); *B64C 2201/024* (2013.01); *B64C 2201/127* (2013.01); *B64C 2201/146* (2013.01)

(58) Field of Classification Search
CPC ................................ B64C 13/18; B64C 13/00
USPC ........................................................ 244/190
See application file for complete search history.

(56) References Cited

U.S. PATENT DOCUMENTS

| 6,634,593 | B2 * | 10/2003 | Lepretre et al. ............... 244/7 B |
| 7,510,142 | B2 * | 3/2009 | Johnson ...................... 244/17.17 |
| 8,214,088 | B2 * | 7/2012 | Lefebure .......................... 701/2 |
| 2008/0048065 | A1 * | 2/2008 | Kuntz ........................ 244/17.23 |
| 2012/0091260 | A1 * | 4/2012 | Callou ........................ 244/17.13 |
| 2014/0008496 | A1 * | 1/2014 | Ye et al. ....................... 244/190 |

* cited by examiner

*Primary Examiner* — Tien Dinh
*Assistant Examiner* — Aaron Rodziwicz
(74) *Attorney, Agent, or Firm* — Lapple Ubell IP Law, LLP; Franklin D. Ubell

(57) ABSTRACT

A method of home inspection comprising guiding a drone through a home along a selected inspection path, transmitting signals from the drone to establishing a flight path through the home, storing the flight path on a server, accessing the flight path from a programmed interactive digital device, launching the drone using said programmed interactive digital device, directing the drone through the home along the flight path and transmitting video signals from the drone and employing the video signals to provide a visual view of the property on a display of the interactive digital device. In another embodiment, the buyer can guide the drone along a flight path determined by the buyer in real time.

16 Claims, 22 Drawing Sheets

| PPDS | Property Preview Drone System |

MLS# [        ]

Password [        ]

[ Submit ]

FIG. 6

| PPDS | Property Preview Drone System |

[ Free Flight ]

[ Pro Flight ]

[ View Previous Flight Video ]

Drone Status:  (Green)  (Red)

FIG. 7

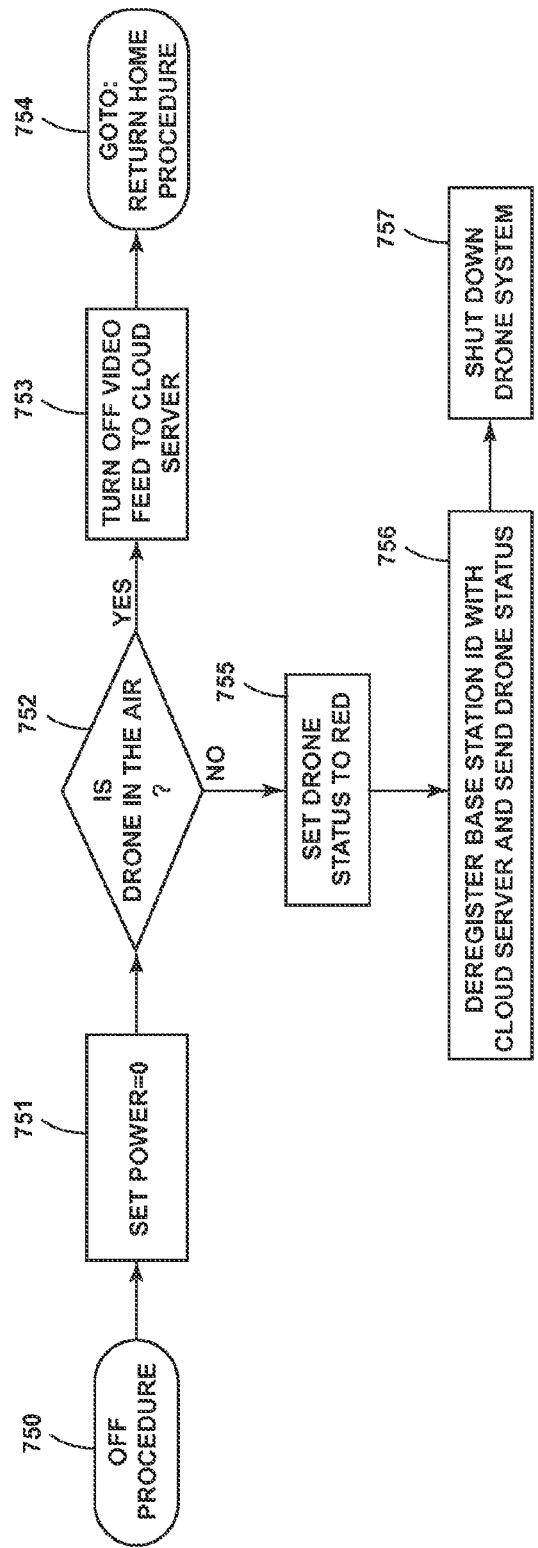
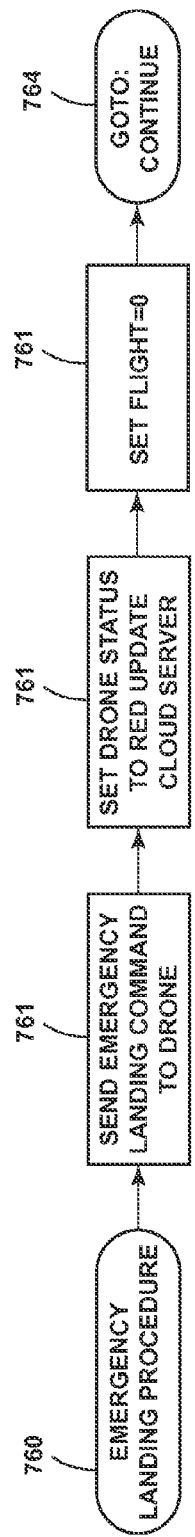
FIG. 19
FIG. 20

PROPERTY PREVIEW DRONE SYSTEM AND METHOD

BACKGROUND OF THE DISCLOSURE

Field of the Disclosure

The subject disclosure relates to a drone system enabling a potential buyer to easily inspect homes or other structures or property which are for sale.

Related Art

A number of different remote control flying drones have been developed to date.

SUMMARY

According to an illustrative embodiment, a method of home inspection comprises guiding a drone through a home along a selected inspection path, transmitting signals from the drone to establishing a flight path through the home, storing the flight path on a server, accessing the flight path from a programmed interactive digital device, launching the drone using the programmed interactive digital device, directing the drone through the home along the flight path, transmitting video signals from the drone, and employing the video signals to provide a visual view of the property on a display of the interactive digital device. In another embodiment, the buyer can guide the drone along a flight path determined by the buyer in real time.

BRIEF DESCRIPTION OF THE DRAWINGS

FIG. 6 illustrates a second web page presented to a buyer according to an illustrative embodiment;

FIG. 7 illustrates a third web page presented to a buyer according to an illustrative embodiment;

FIG. 19 is a Base Station process flowchart of an illustrative "Power Off" procedure for flying an illustrative drone;

FIG. 20 is a Base Station process flowchart of an illustrative "Emergency Landing" procedure for flying an illustrative drone.

DETAILED DESCRIPTION

Figure 1:
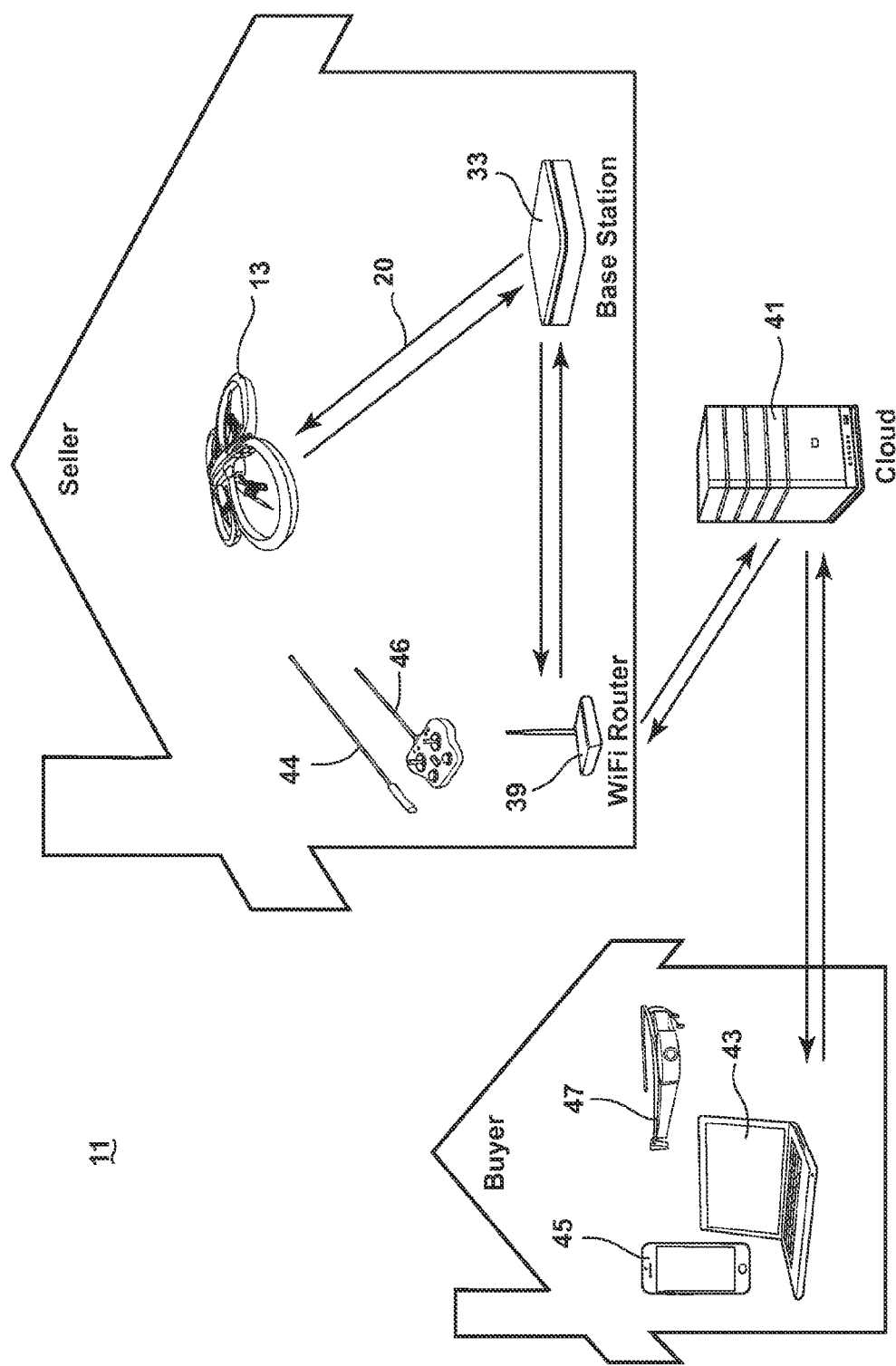
FIG. 1 is a system diagram of a property preview drone system.
Figure 2:
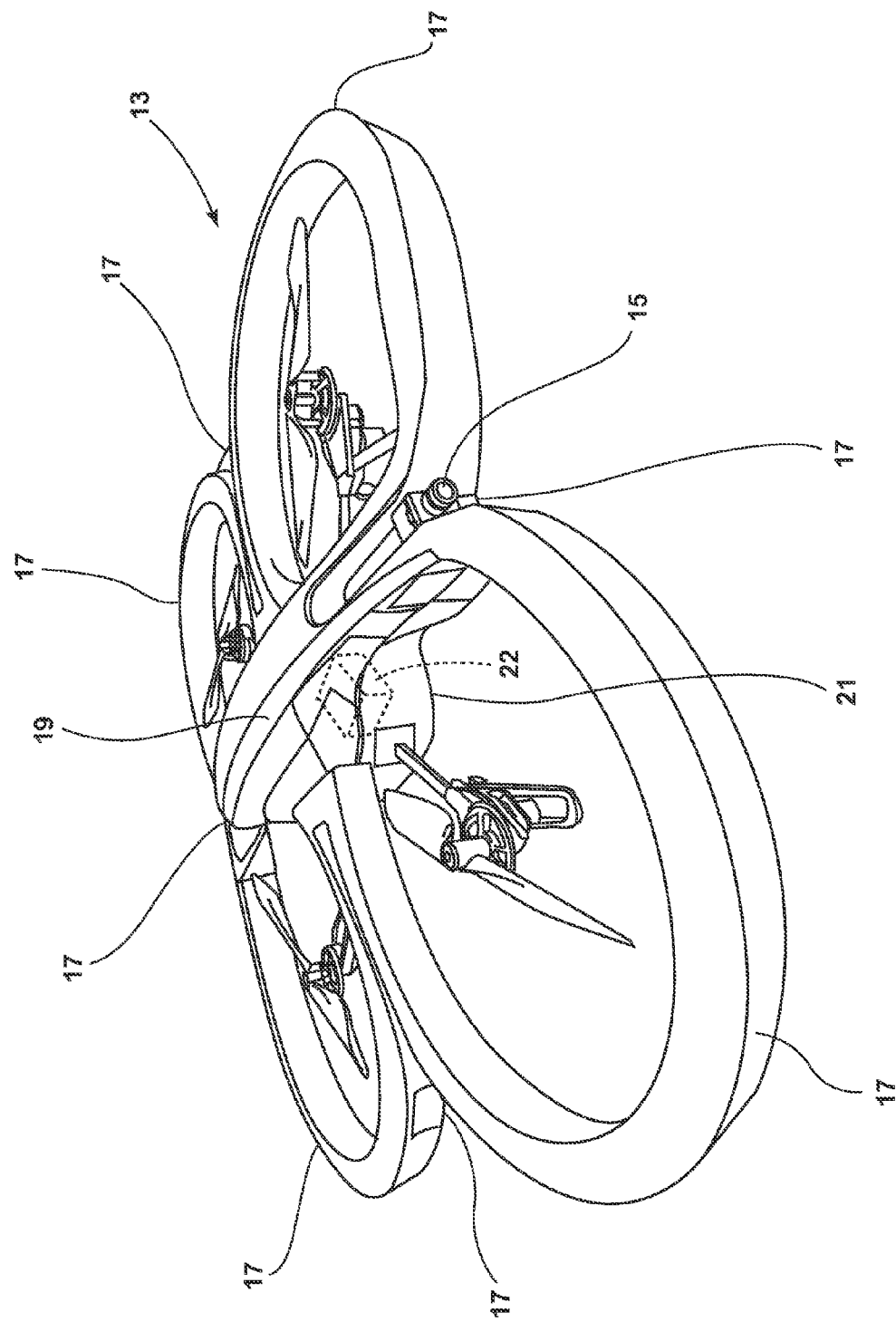
FIG. 2 is a perspective view of a drone for use in the system of FIG. 1.
Figure 3:
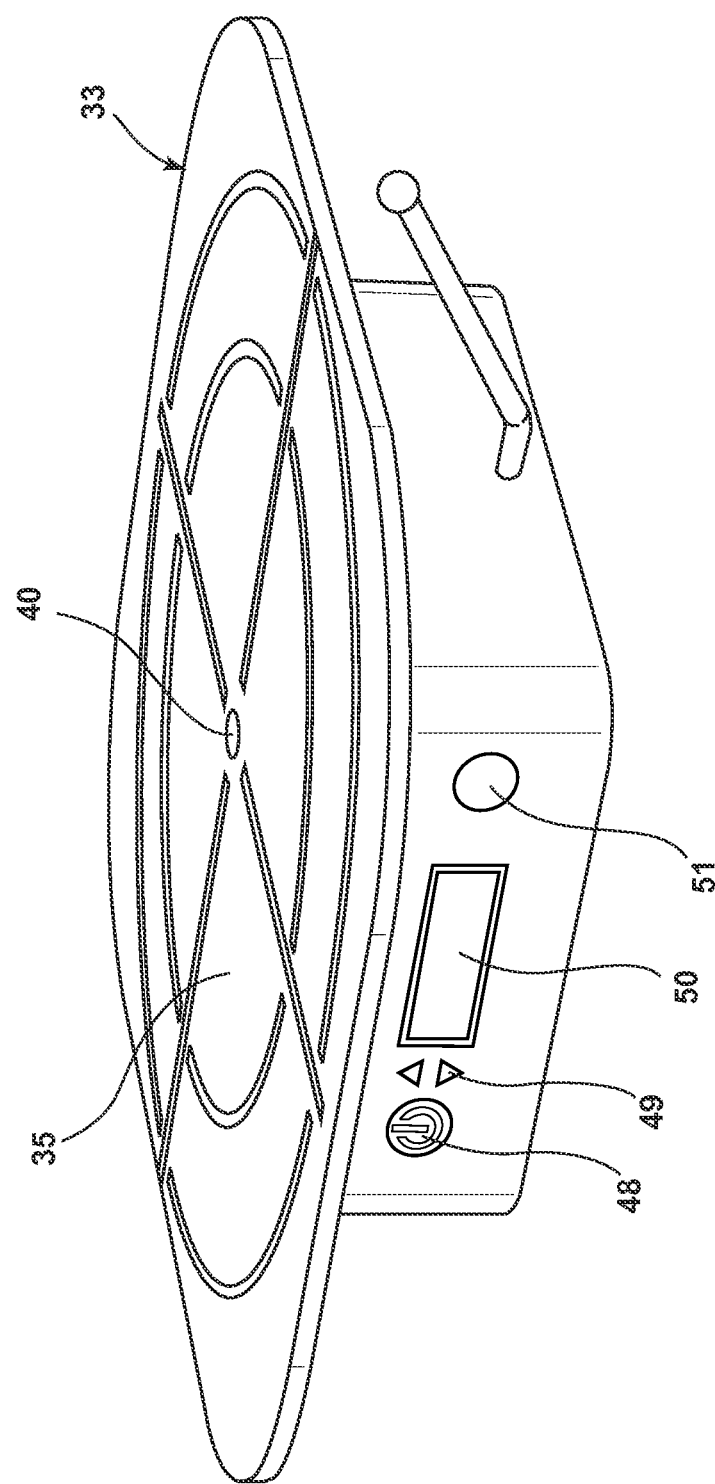
FIG. 3 is a perspective view of a base station component of the system of FIG. 1.
Figure 4:
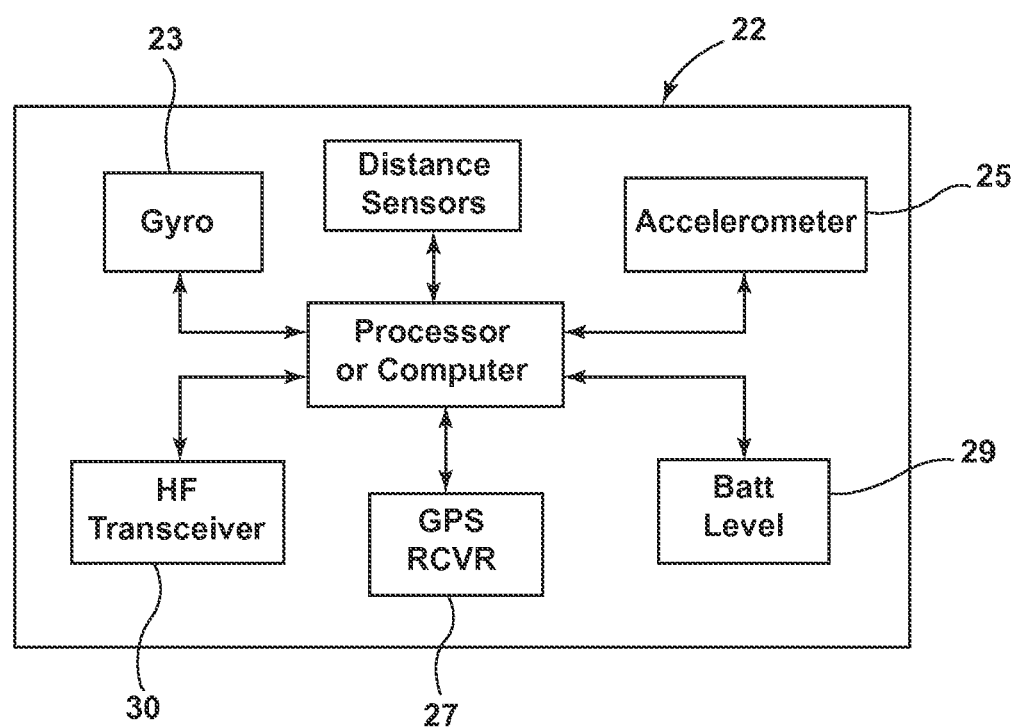
FIG. 4 is a block diagram illustrating various control system components of an illustrative drone.

An illustrative property preview drone system 11 is illustrated in FIGS. 1-3. The system comprises a semi-autonomous remotely operated Multicopter Drone 13 that is designed for operation inside and outside a building and is equipped with a video camera 15 and various sensors 17, 19, 21 that allow the Drone 13 to safely operate in its environment. Apart from the video camera 15, the Drone 13 is equipped with at minimum these sensors: Distance measuring sensors in at least 6 directions including XY plane sensors 17, upward Z axis sensor 19 and downward Z axis sensor 21 (FIG. 2). The drone control system 22 (FIG. 4) may be microprocessor-based and includes a 3-axis gyro sensor 23, and a 3-axis accelerometer sensor 25, a GPS receiver 27 and a battery level sensor 29. When operational, the Drone 13 always maintains an HF wireless link 20 between its transceiver 30 and a Base Station 33 and continues to send data from its sensors to the Base Station 33.

The distance measuring/ranger finder sensors 17, 19, 21 can be of varying kinds: acoustic sonar range finders like the MaxBotix MB1200 series, or a Pulsed Optical sensor like the PulsedLight Lidar Lite, a standard LIDAR sensor like the Velodyne VLP-16, or alternatively the Drone 13 can be equipped with video environmental sensors for instance Intel RealSense 3D Camera Technology.

The HF transmitter Base Station 33 has a built-in wireless charging pad 35. This Base Station 33 is the main component that receives the real time sensor signals from the drone 13, and it compares this data to a prerecorded Flight Path, and uses the HF link to direct the Drone 13 alone its flight path. In one embodiment, the Base Station 37 is equipped with a homing beacon. In another embodiment, the Base Station 33 has a built in camera 40 that can locate the Drone 13 and direct it do the landing spot on the wireless charging pad 35.

The system of FIGS. 1-3 further includes a home WiFi router 39 that enables the Base Station 33 to connect to the Internet, a Cloud Server 41 that handles communication between the Base Station 33 and a user-operated programmed interactive device, for example, such as the Buyer's personal computer or "PC" 43 or Smartphone 45, each having a respective display 44, 46. An extension handle 44 to which the Drone 13 is mounted when setting up a proposed flight plan and an HF handheld Remote Control 46 for the Drone 13 is also provided.

In operation according to one illustrative embodiment, the seller mounts the Drone 13 to the extension handle 44 which causes all the sensors to become operational. The Seller now walks the Drone 13 along a proposed flight path, through the property for sale, making sure that the flight path is safe and will give a good overview of the property. Alternatively, the Seller can fly the Drone 13 through the property using the remote control 46.

The Base Station 33 is in contact with the Drone 13 through the HF link 20 and during walk through will record the signals from all the sensors in the Drone 13, and, in one embodiment, upload this data to the Cloud Server 41 which uses its processing power to create a detailed flight map taking into account all potential obstacles and barriers detected to lay out an optimized Flight Path for the Drone 13 to follow.

In another embodiment, the Base Station 33 handles the creation of the flight path independently. For safety, in one embodiment, the Flight Path created, e.g., by the Cloud Server 42, is exactly centered in corridors and doorways and runs parallel to walls where required. This fixed Flight Path assists in preventing the Drone 13 from bumping into obstacles, for example, such as lamps and plants. The Flight Path includes all the sensor readings to be expected from the drone sensors at any time when following the Flight Path. Independently, in one embodiment, the Cloud Server 41 has access to a viewable floor plan of the property, which may be made available to the prospective Buyer through the Server's web interface, so that the Buyer can determine where to direct the Drone 13.

According to one operational embodiment, the Seller can enable or disable operation of the Drone 13 at any time, e.g., to maintain privacy. This can be achieved through various means: the Seller can operate an ON/OFF button 48 to enable or disable the drone system. Alternatively the Seller can use a combination of Buttons 48, 49 and Display 50 to set up a Time Schedule for allowed operation of the drone.

If a prospective Buyer is interested in the property, the Buyer logs into the Cloud Server 41 using his PC 43 or Smart Phone 45, or through a wearable electronic device 46. When logged in, the Buyer can launch the Drone 13 from its Base Station 33 and direct it through the property anywhere along the Flight Path which the Seller has set up.

In one embodiment, the Seller can put the Base Station 33 in standby mode in which a prospective buyer can request operation of the Drone 13, after which base station 33 will emit a beeping sound through a built in sounding device in combination with visual flashing light indicator 51 until the Seller responds to this request and enables the Drone 13 to take flight. This way the Seller can enable operation of the Drone 13 on individual request basis.

In one embodiment, the time schedule programming and enabling the Drone 13 on a case by case basis can be controlled via a Software application that runs on the seller's Smart Phone, or be done at the seller's request from the Cloud Server by a central office.

Upon Drone launch, the Base Station 33 turns on its homing beacon and directs the Drone 13 toward the Flight Path. The Base Station 33 directs the Drone 13 along the Flight Path by responding to Buyer input enabling the Buyer to have a detailed look at the property. The Base Station 33 at this time has extensive data on the exact surroundings at any location along the Flight Path, and by comparing this data to the real time signals from the drone's sensors 17, 19, 21, the Base Station 33 knows the exact location of the Drone 13.

By comparing the recorded Flight Path sensor data with real time sensor signals from the Drone 13, the Base Station 33 fine tunes the drone trajectory until the real time drone sensor output closely matches the data in the recorded Flight Path. This is a continuous feedback process while the Drone 13 is operational in the air.

In one embodiment, the Drone 13 flies exactly along the centerline of corridors and doorways. The distance sensors 17, 19, 21 that the Drone 13 employs enables it to keep a minimum distance to walls and prevent it from bumping into obstacles like for instance lamps and plants, even if these obstacles were added after the initial Flight Path was generated.

If, for example, an interior door has been closed that in the previously establish Flight Path allowed the Drone 13 to pass through, the Drone 13 will attempt to bypass this restriction staying close to the flight path. If this restriction means a new end point of the Flight Path, the Drone 13 will stop at this point, and if it does not receive input from the Buyer within 60 seconds, the Base Station 33 returns the Drone 13 back to the Wireless Charging Pad 35.

The Drone 13 is equipped with a video camera 15, and the video feed is sent real time from the Drone 13 to the Base Station 33 and then on to the Cloud Server 41 from where it is made available to the Buyer on his PC 43 or Smart Phone 45 in real time. The Buyer can direct the camera 15 in any direction at any time while the Drone 13 is flying along the Flight Path. The Buyer can also stop the Drone 13 and have it hover anywhere along the Flight Path, directing the camera 15 in any desired direction. The video camera 15 also has a zoom function which enables the Buyer to zoom in on details he or she desires to have a detailed look at.

If the battery charge level of the Drone 13 drops below a set minimum level, or if the Buyer leaves the Drone 13 unattended by not giving it directions for more than 60 seconds, then the Base Station 33 will direct the Drone 13 back to the Base Station 33 following the Flight Path until the Drone 13 receives a signal from the homing beacon.

At this time, the Base Station 33 continues to use the various sensor signals to direct the Drone 13 exactly onto the Wireless Charging Pad 35. In one embodiment, the Drone 13 attempts to fine tune the landing spot location by maneuvering so as to close in on the homing signal beacon, which is functionality that takes precedence over the Base Station directions. In another embodiment, a Base Station camera 40 locates the Drone 13 when it is within viewing range, and then exactly guides the Drone 13 onto its landing spot on the wireless charging pad 35. After landing on the Wireless Charging Pad 35, the Drone 13 will enable its battery pack to be recharged.

In one embodiment, a waiting list system is set up on the Cloud Server 43, in case more people want to operate the same Drone 13 at the same time, or enable any Buyer to view the current video stream from the Drone 13. In one embodiment, if the Drone 13 loses the HF radio link with the Base Station 33, it is programmed to stay in the air for a minute. If the HF link is not re-established within one minute, the Drone 13 will very slowly land vertically.

According to an alternative mode of operation, if a prospective Buyer is interested in the property, the Buyer logs into the Cloud Server 41 using a PC 43 or Smart Phone 45. When logged in, the Buyer can then launch the Drone 13 from its Base Station 33 and direct it through the property. Upon Drone launch, the Base Station 33 turns on its homing beacon. The Base Station 33 then directs the Drone 13 by responding to Buyer input, enabling the Buyer to have a detailed look at the property. In one embodiment, the Drone 13 will attempt to fly at a standard height of about 5 feet 6 inches from the ground.

From the beginning of every flight and throughout the flight, the Base Station 33 records the flight path that the Drone 13 has taken by recording the stream of data coming from the various sensors 17, 19, 21. The Drone 13 also uses this real time feedback from its distance sensors to prevent it from bumping into any walls, doors or obstacles.

Staircases require a special method to enable the Drone 13 to fly up or down over them. The Base Station 33 looks at up/down elevation signals from the Drone 13 at all times. When the Drone 13 reaches a stair case, this height will change by 6 to 10 inches for each step and the Drone 13 simply endeavors to keep a 5 foot 6 inch distance from the steps.

The Buyer is free to fly the Drone 13 around the property. Based on the record of the flight data, the Base Station 33 knows where the Drone 13 is at any time and can direct the Drone 13 back to the Base Station 33 and Charging Pad 35.

If the battery charge level of the Drone 13 drops below a set minimum level, or if the Buyer leaves the Drone 13 unattended by not giving it directions for more than 60 seconds, then the Base Station 33 will direct the Drone 13 back to the Base Station 33 by tracing the same flight path back until the Drone 13 receives a signal from the homing beacon.

At this time, the Base Station 33 continues to use the various sensor signals to direct the Drone 13 exactly onto the Wireless Charging Pad 35. In one embodiment, the Drone 13 attempts to fine tune the landing spot location by maneuvering so as to close in on the homing signal beacon, which is functionality that takes precedence over the Base Station directions. In another embodiment, the Base Station camera 40 locates the Drone 13 when it is within viewing range and then guides the Drone 13 onto its landing spot on the wireless charging pad 35. After landing on the Wireless Charging Pad 35, the Drone 13 causes its battery pack to be recharged.

Figure 5:
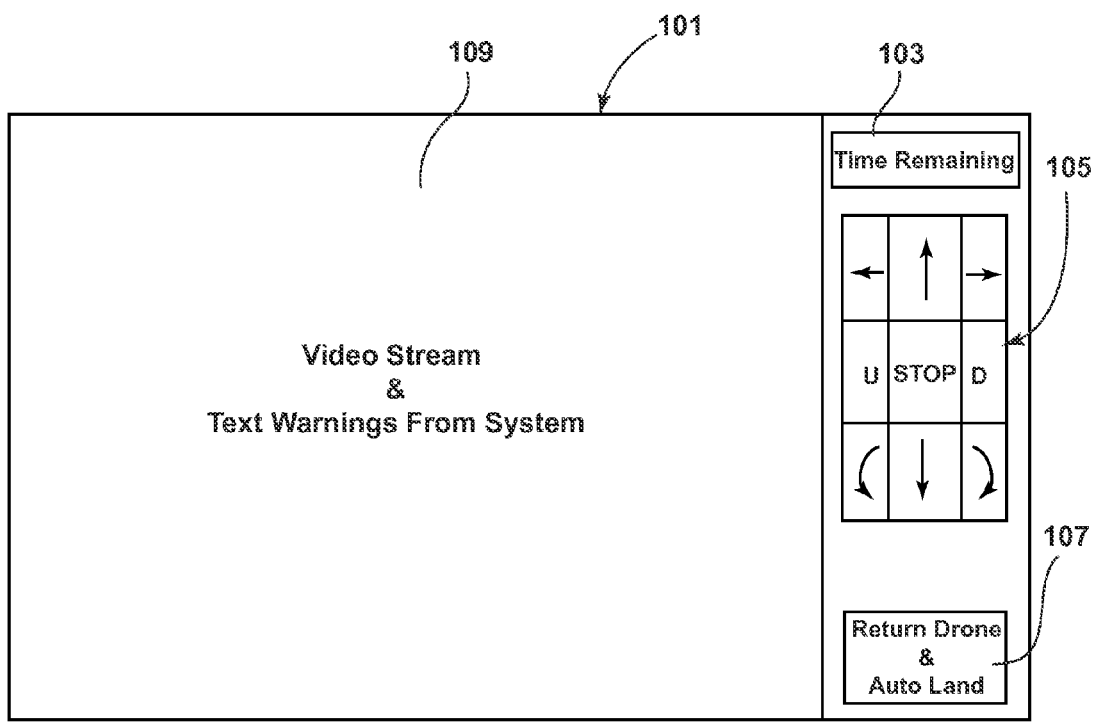
FIG. 5 illustrates a first web page presented to a buyer according to an illustrative embodiment.
Figure 8:
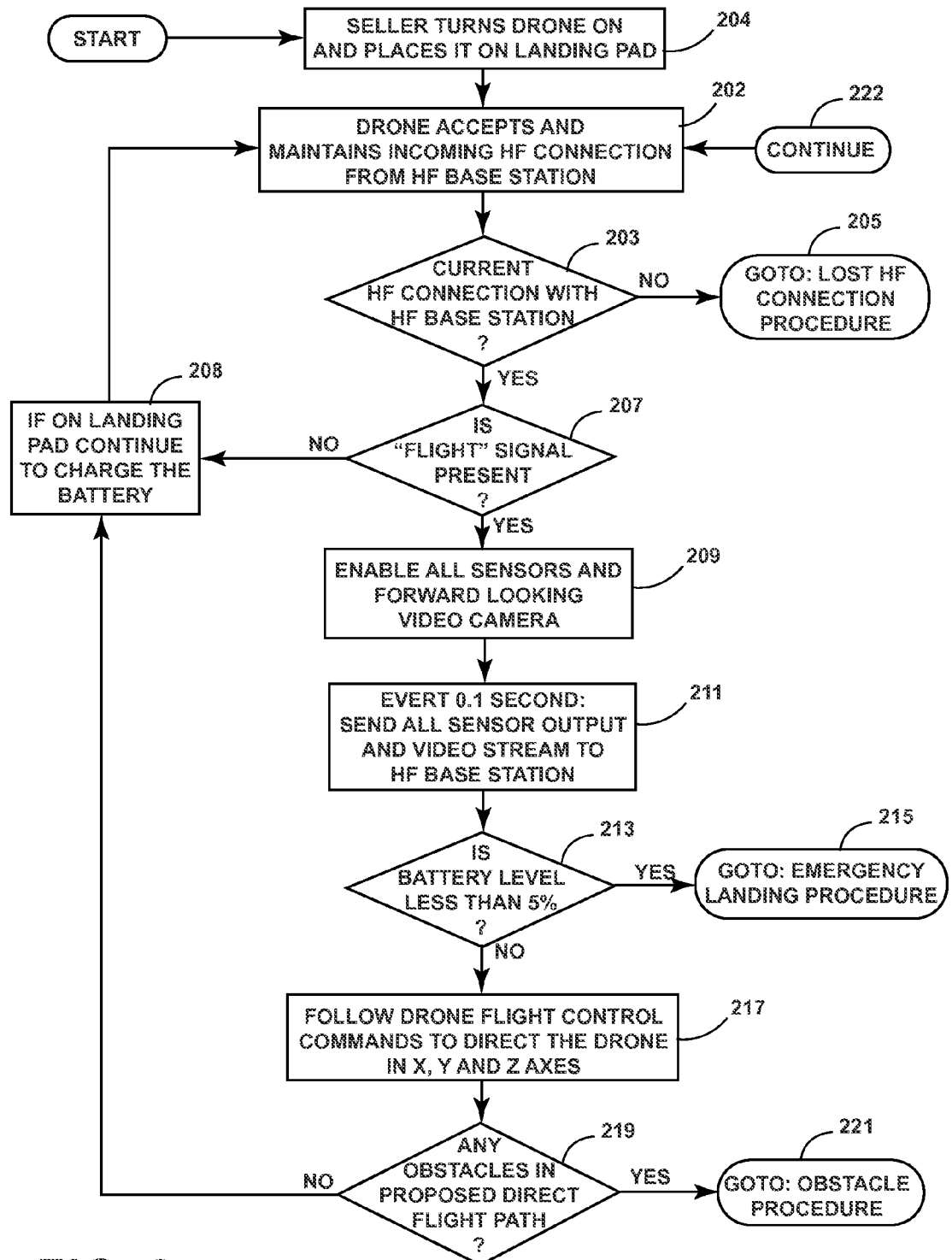
FIG. 8 is a first flowchart illustrative of the operation of an illustrative drone embodiment.

FIG. 5 shows a screen display or webpage 101 presented to a buyer to allow the buyer to fly the Drone 13 in a "free flight" procedure. The display 101 presents a time remaining indicator 103 indicative of the flight time remaining for the drone. Control icons 105 are provided to permit the buyer to move the drone up or down, to the right or to the left, to circle clockwise or counterclockwise or to stop and hover. In an illustrative embodiment, these functions are activated by touching the icon with a cursor activated, for example, by a mouse. Other means of control could be provided in other embodiments, for example, such as a joystick control.

The screen display 101 also provides an icon 107 to enable activating a return and land procedure discussed in more detail below. A portion 109 of the screen display 101 permits display of a streaming video feed discussed further below, as well as display of text warnings from the system.

FIG. 6 illustrates a web page permitting a buyer to log in to the cloud server 41 by entering a multiple listing number and a password as discussed further below. FIG. 7 is another webpage provided to the buyer where the buyer may select a free flight procedure for the Drone 13 or a pre-programmed flight procedure for the Drone 13. The page of FIG. 7 also enables the buyer to select a previous flight video for viewing and displays the drone status as "red" or "green." "Red" means the Drone 13 is not ready to fly because its battery is being charged or for any other reason that prevents the drone taking flight, while "green" represents that the Drone 13 is ready to fly.

FIGS. 8 to 11 are flowcharts illustrative of various software implemented functions and operation of the Drone 13. In step 204 of FIG. 8, the seller turns the Drone 13 on and places it on the landing pad 33. In step 202, the Drone 13 accepts and maintains an incoming HF connection from the HF base station 33. At test 203, the status of the current HF connection with the HF base station 33 is checked. If connection has been lost, a lost connection procedure is implemented, step 205. If there is an HF connection, the Done 13 checks to see if a "flight" signal is present, test 207. If it is, the Drone 13 enables all sensors and its forward looking video camera, step 209. Then every 0.1 second the Drone 13 sends all sensor outputs and a video stream to the HF base station 33, as reflected by step 211.

At test 213, the Drone 13 determines whether its battery level is less than 5%. If it is, the Drone 13 performs an emergency landing procedure, step 215. If the battery level is satisfactory, the Drone 13 follows its flight control commands to direct the Drone 13 in X, Y, and Z axes, step 217. Then a test 219 is performed to see if there are any obstacles in the proposed direct flight path. If there are, an obstacle avoidance procedure is performed, step 221.

Figure 9:
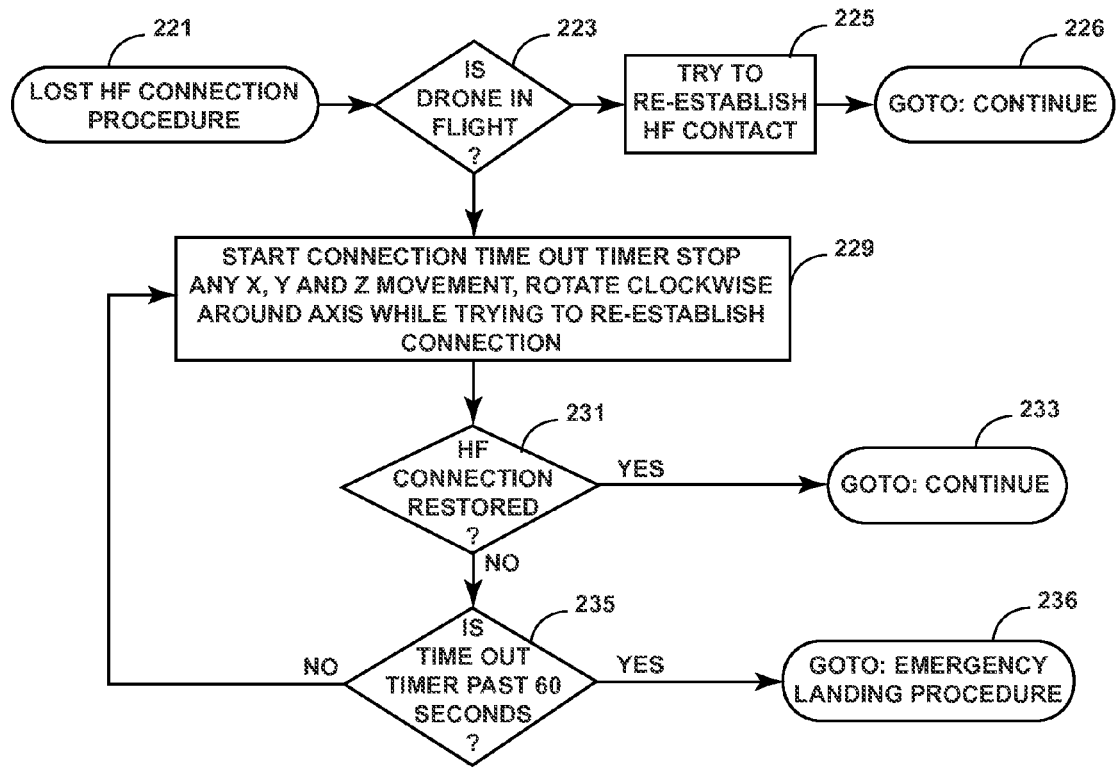
FIG. 9 is a second flowchart illustrative of the operation of an illustrative drone embodiment.

As shown in FIG. 9, if the HF connection has been lost, a test 223 is performed to detect whether the Drone 13 is in flight. If it is not, an attempt to reestablish HF contact is made, step 225, and the procedure returns to the "continue" point 222 of FIG. 8 at step 226. If the Drone 13 is still in flight, the reconnection procedure of step 229 is followed: a connection time out timer is started, X, Y, Z movement of the drone is stopped, and the Drone 13 is rotated clockwise around its axis while trying to reestablish connection. A test 231 is then performed to see if the HF connection has been restored. If so, the procedure returns to point 222 of FIG. 8 at step 223. If not, a test 235 is performed to detect whether the time out timer is past 60 seconds. If it is, the process goes to the emergency landing procedure.

Figure 10:
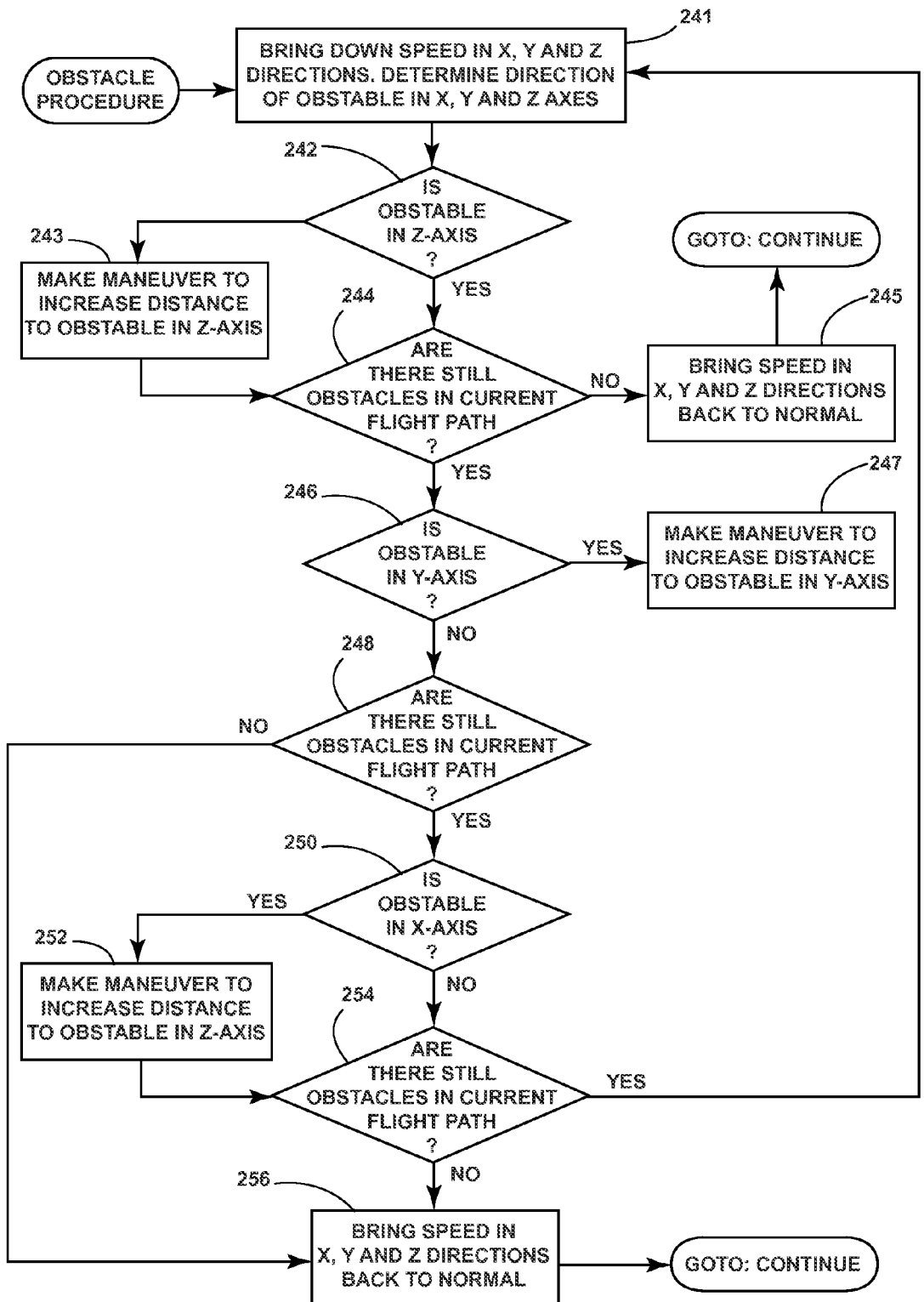
FIG. 10 is a third flowchart illustrative of the operation of an illustrative drone embodiment.

In the obstacle avoidance procedure step 241 of FIG. 10, the drone's speed is first brought down in X, Y and Z directions, and a determination is made of the direction of the obstacle in X, Y and Z axes. A test 242 is made to detect whether there is an obstacle in the Z-axis; if so, in step 243, a maneuver is made to increase the distance to obstacle in the z-axis. Then a test 241 is performed to determine if there are still obstacles in the current flight path. If not, in step 245, the drone speed in the X, Y and Z directions is brought back to normal. If there is still an obstacle in the flight path, test 246 is performed to see if there is an obstacle in Y-axis. If there is, step 247 is performed to make a maneuver to increase the distance to the obstacle in the Y-axis. If there is not, test 248 is performed to determine if there are still obstacles in the current flight path. If so, test 250 is performed to determine if there is an obstacle in the X-axis. If there is, step 252 is performed to make a maneuver to increase the distance to obstacle in the X-axis. Then test 254 is performed to determine if there are still obstacles in the current flight path. If there are not, the drone's speed is brought back to normal in the X, Y and Z directions. If there are, the process returns to step 241.

Figure 11:
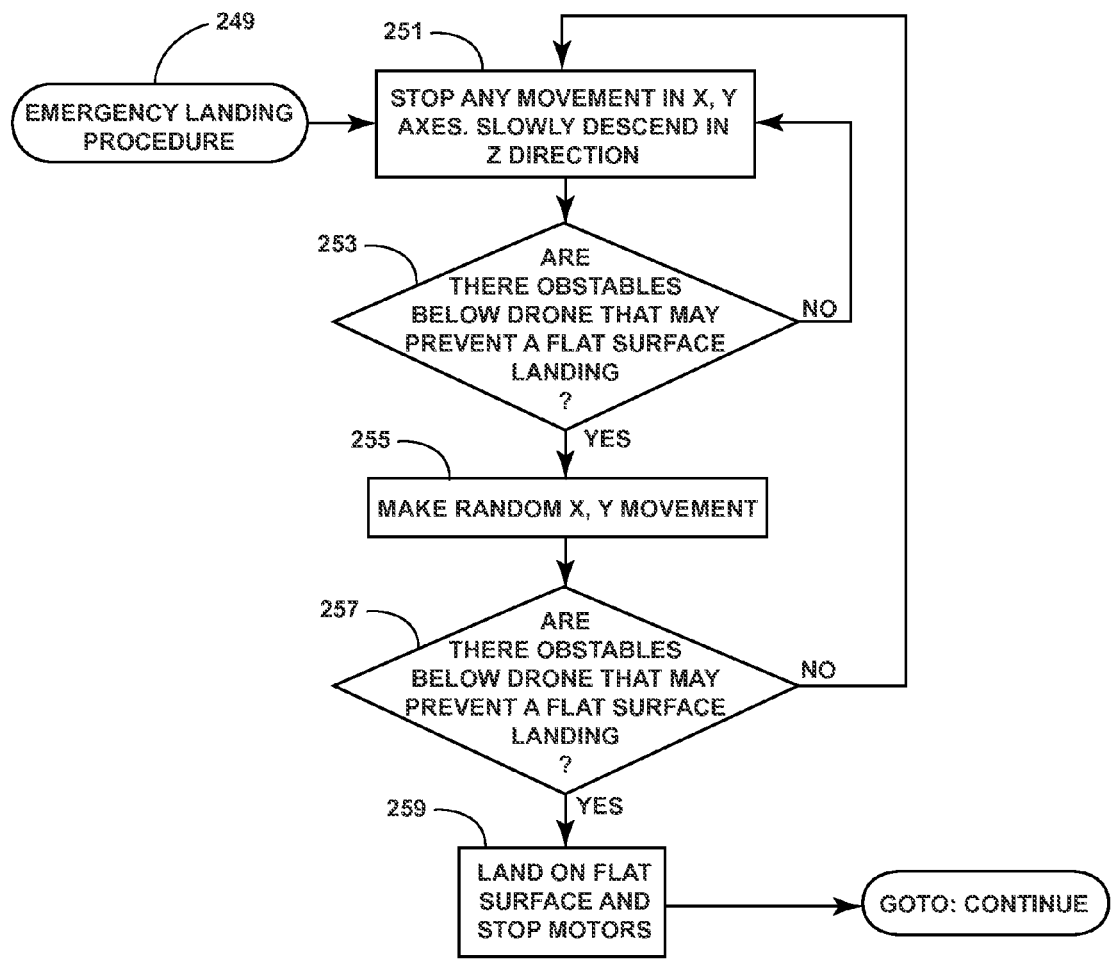
FIG. 11 is a fourth flowchart illustrative of the operation of an illustrative drone embodiment.

In the emergency landing procedure 249 of FIG. 11, any movement in X, Y axes is stopped and the Drone 13 slowly descends in the Z direction, step 251. A test 253 is then performed to detect whether there are obstacles below the Drone 13 that may prevent a flat surface landing. If there are, step 255 is performed to make random X, Y movements. If there are not, the process returns to step 251 to continue the descent. After making a random X,Y movement in step 255, a test 257 is performed to determine if there are obstacles below the Drone 13 that may prevent a flat surface landing. If not, the Drone 13 proceeds to land, step 259.

Figure 12A:
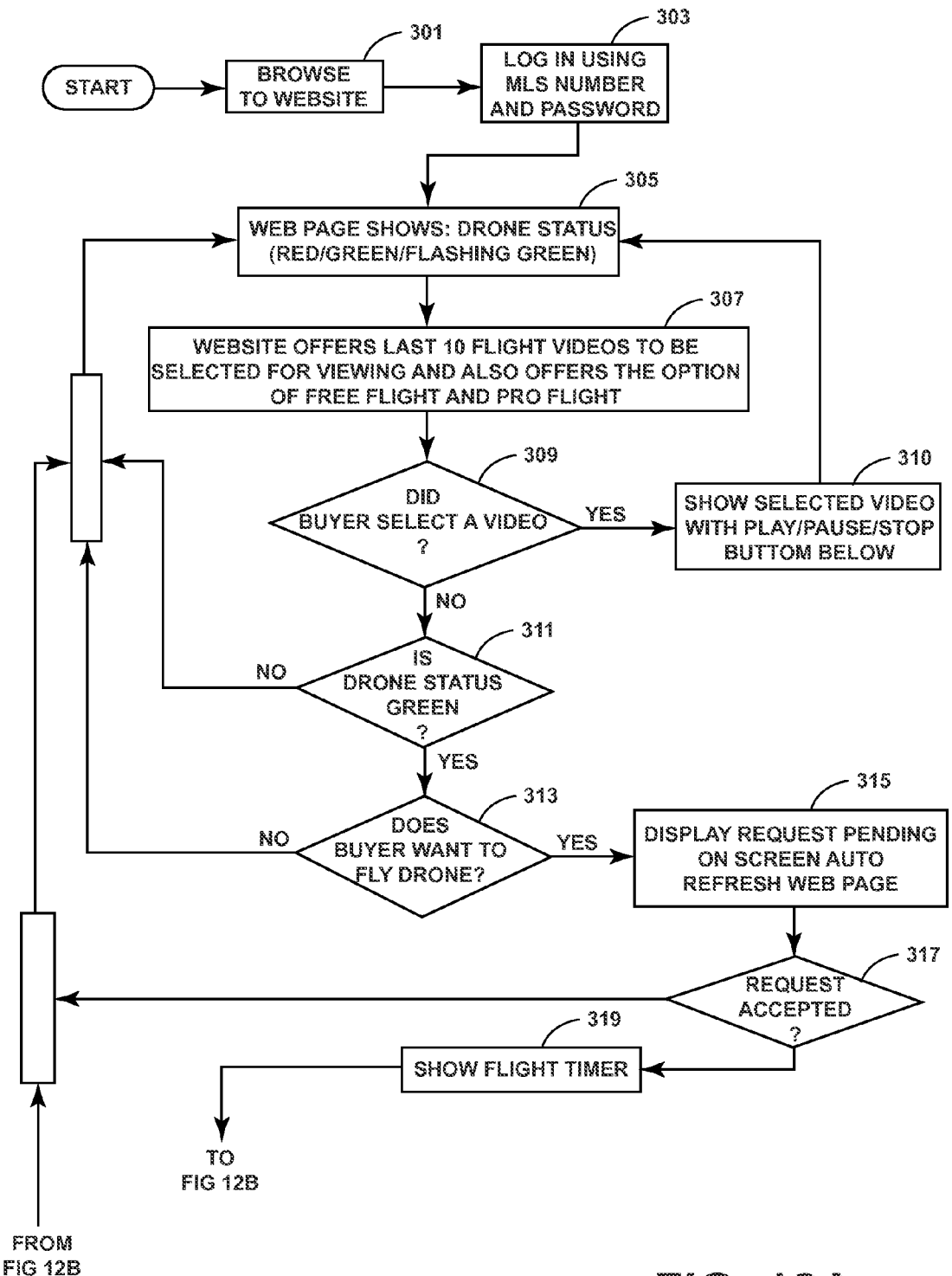
FIG. 12A is a first flowchart illustrative of operations performed by the buyer in accordance with an illustrative embodiment.
Figure 12B:
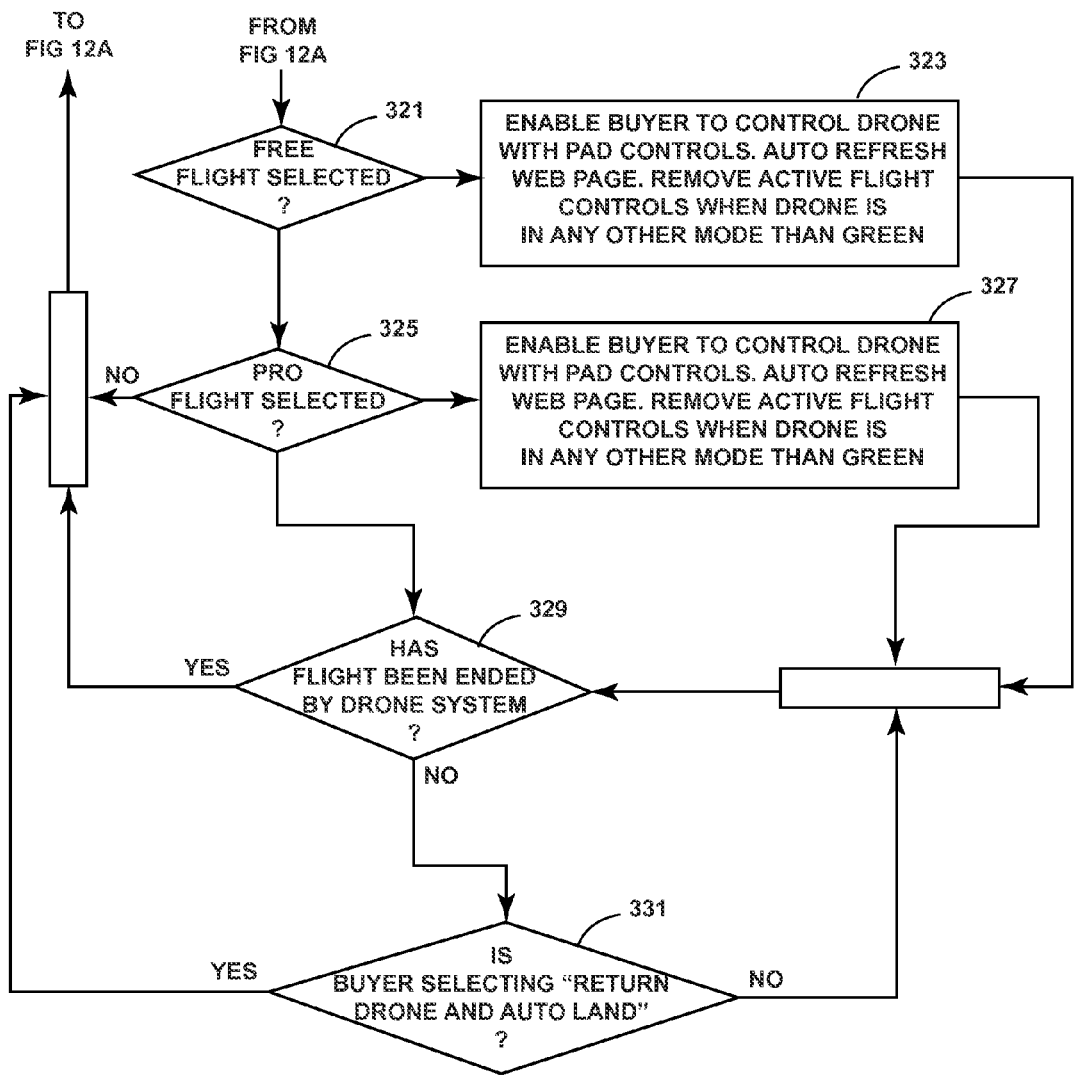
FIG. 12B is a continuation of the flowchart of FIG. 12A.

FIGS. 12A and 12B illustrate software processes performed in connection with the buyers programmed digital device, e.g. personal computer 43. In step 301, the buyer browses the cloud server website and logs in on the screen display of FIG. 6 using an MLS (Multiple Listing) number and password, step 303. The web page of FIG. 7 is then presented showing drone status (red/green/flashing green) and offers the last 10 flight videos for selection by the buyer for viewing and also offers the option of free flight and pre-programmed ("pro") flight, steps 305, 307. If the buyer selects a video, a test 309 is satisfied and the selected video is shown with play/pause/stop button below. If not, tests 311, 313 are performed to confirm that the drone status is still green and to ask whether the buyer wants to fly the drone 13.

After the buyer is shown the flight timer at step 319, tests 321, 325 are performed to determine whether the buyer has selected "free flight" or "pro flight." In either case, the "system" performs step 323 or 327 to enable the buyer to control the Drone 13 with the pad controls. The buyer can raise the drone flight level by clicking on the "UP" (U) or "DOWN" (D) button, can fly in forward direction by continuously clicking the on screen forward arrow button, fly in reverse direction by continuously clicking the back facing arrow button, move to the left by continuously clicking the left facing arrow button, move to the right by continuously clicking the right facing arrow button. In Pro Flight, the left and right controls are grayed out since they will not be available. After performance of either step 323 or 327, the process proceeds to test 329 to determine if base station 33 has ended the drone flight. If not, the process proceeds to test 331 to determine whether the buyer has selected the "return and auto land" procedure. If not, the process returns to test 329. If so, drone status will switch to "RED" and the web page will offer only pre-recorded videos, not live flight.

Figure 13A:
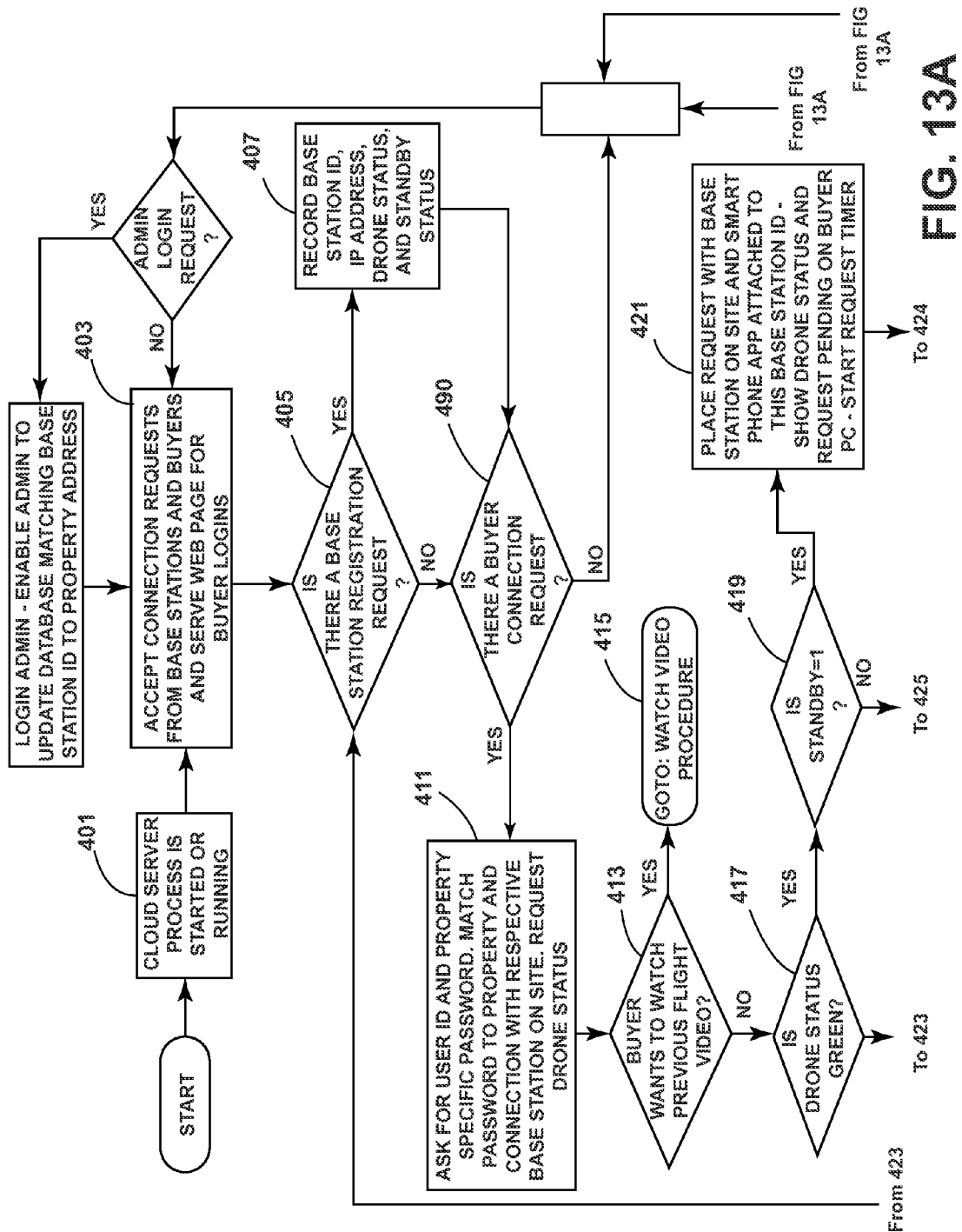
FIG. 13A is a first flowchart illustrative of operation of a cloud server according to an illustrative embodiment.
Figure 13B:
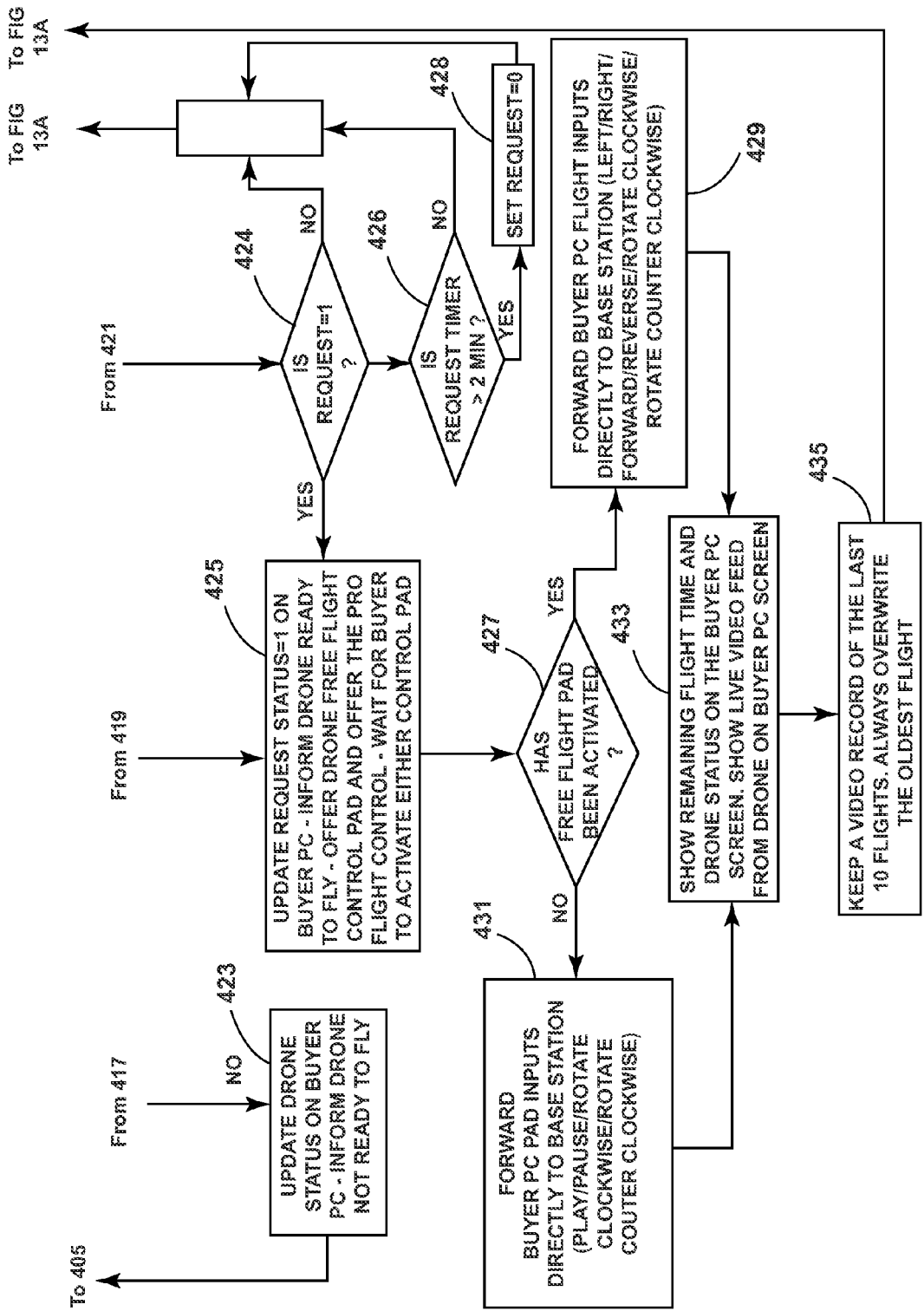
FIG. 13B is a second flowchart illustrative of operation of a cloud server according to an illustrative embodiment.

FIGS. 13A and 13B show illustrative processes implemented at the cloud server 41. At step 401, the cloud server process is started or is running and is prepared to accept connection requests from base stations, e.g. 33, and from buyers, and to serve a web page in response to buyer logins, as shown in step 403. At test 405, the process detects a base station registration request. If there is such a request, the process records the base station ID, IP address, drone status, and standby status, step 407, and then performs a test 409 to determine if there is a buyer connection request. If there is, the process proceeds to step 411 and asks for the user ID and property specific password, matches the password to a property and connects with the appropriate base station, e.g. 33, on site and requests drone status of the Drone 13 located at the particular property.

Then at test 413, the process determines whether the buyer wants to watch a previous flight video. If so, the process goes to the watch video procedure 415. If not, the process proceeds to test 417: Is drone status green? If it is, a test 419 is performed to determine: Is standby=1. If standby=1, a request is placed with the base station 33 on site and with the smart phone app associated with this base station's ID to show the drone status and that a request is pending on the buyer's PC 43 and a request timer is started, all as reflected by step 421. The flow proceeds from step 421 to tests 424 and 426 (FIG. 13B) where tests are performed to determine whether Request=1 and whether the request timer has timed an interval greater than two minutes. If either test is negative, the flow returns to FIG. 13A. If test 426 is positive, Request is set to zero, step 428, and the flow returns to FIG. 13A.

If the drone status is not "green" at test 417, the process updates the drone status on the buyer PC 43 to inform the buyer that the Drone 13 is not ready to fly, step 423. If, at test 419, it is determined that standby is not equal to "1", the process updates request status=1 on the buyer's PC 43 and informs the buyer that the Drone 13 is ready to fly, step 425. The process further offers drone "free flight" and "pro flight" options to the buyer and waits for the buyer to select either, also in step 425.

At test 427, the process determines whether free flight has been selected, and, if so, in step 429, the buyer's PC flight control inputs are forwarded directly to the base station 33 to control the drone flight path (left/right/forward/reverse/rotate clockwise/rotate counter clockwise). If free flight has not been selected, the programmed flight inputs are forwarded directly to the base station 33 from the cloud server 41, (forward/reverse/rotate clockwise/rotate counter clockwise) as indicated by step 431. After performance of either step 429 or step 431, the remaining flight time and drone status is displayed on the buyer's PC screen, FIG. 5, and the live video feed from the Drone 13 is also displayed on the buyer's PC screen, step 433.

Figure 14:
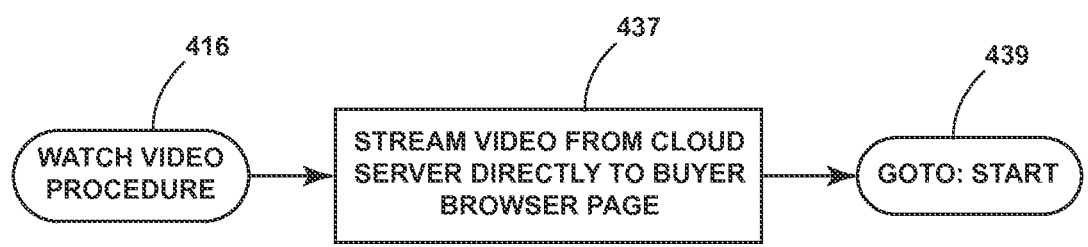
FIG. 14 illustrates a video streaming procedure according to an illustrative embodiment.

As reflected by step 435, the process maintains a stored video record of the last 10 flights, and always overwrites the oldest flight. At test 428, the test Is request timer>2 min ? is performed and if satisfied Request is set to zero. According to the watch video procedure, FIG. 14, video is streamed from the cloud server 41 directly to buyer's browser page, step 437, and the process then returns to START in step 439.

FIGS. 15A and 15B, 16, 17, 18, 19 and 20 show illustrative processes implemented on the Base Station 33. At FIG. 15A "START", the process is started once the Seller turns on the Base Station 33. A Set Power=1 variable is set, and Internet connectivity is enabled and configured in steps 703, 704 and 705.

A Flight=0 variable is set in step 706, and there is a check for variable Power=0 in step 707. If Power=0, the process goes to turn the Base Station off in step 708 which is the end of the process. If the Power=0 test is not met, the process goes to steps 710 and 715 where it is determined if it is time to register the Base Station 33 with the Cloud Server 41 again, and, if so, a registration timer is started in step 715. In step 711, the process determines whether the Standby Timer is past 20 minutes, and, if it is, the process will set variable Standby=1 again, and proceed to step 717. If the Standby Timer is not past 20 minutes, the process proceeds to a check in step 712 if the Red Status Timer is running. If not, then the process continues to step 717, otherwise, in step 713, a determination is made if the Red Status Timer is past 30 minutes. If so, in step 714, the Red Status Timer is stopped and reset after which the process continues back to step 719 and, if not, the process moves to step 718 where it is determined if the Drone status has changed, in which case the process goes to step 715 to register with and update the Cloud Server 41. If the Drone status remains unchanged, a test in step 730 checks for variable status Flight=1 and if the Drone 13 status is "Green", if it is not, the process returns to step 710, otherwise the process continues to steps 731 and 732 where the Home Beacon on the Base Station 33 is turned on and the Flight Timer is started. In step 733, a determination is made as to which type of flight has been selected: Pro Flight or Free Flight, each going to their respective separate procedures in steps 734 or 735.

Figure 18:
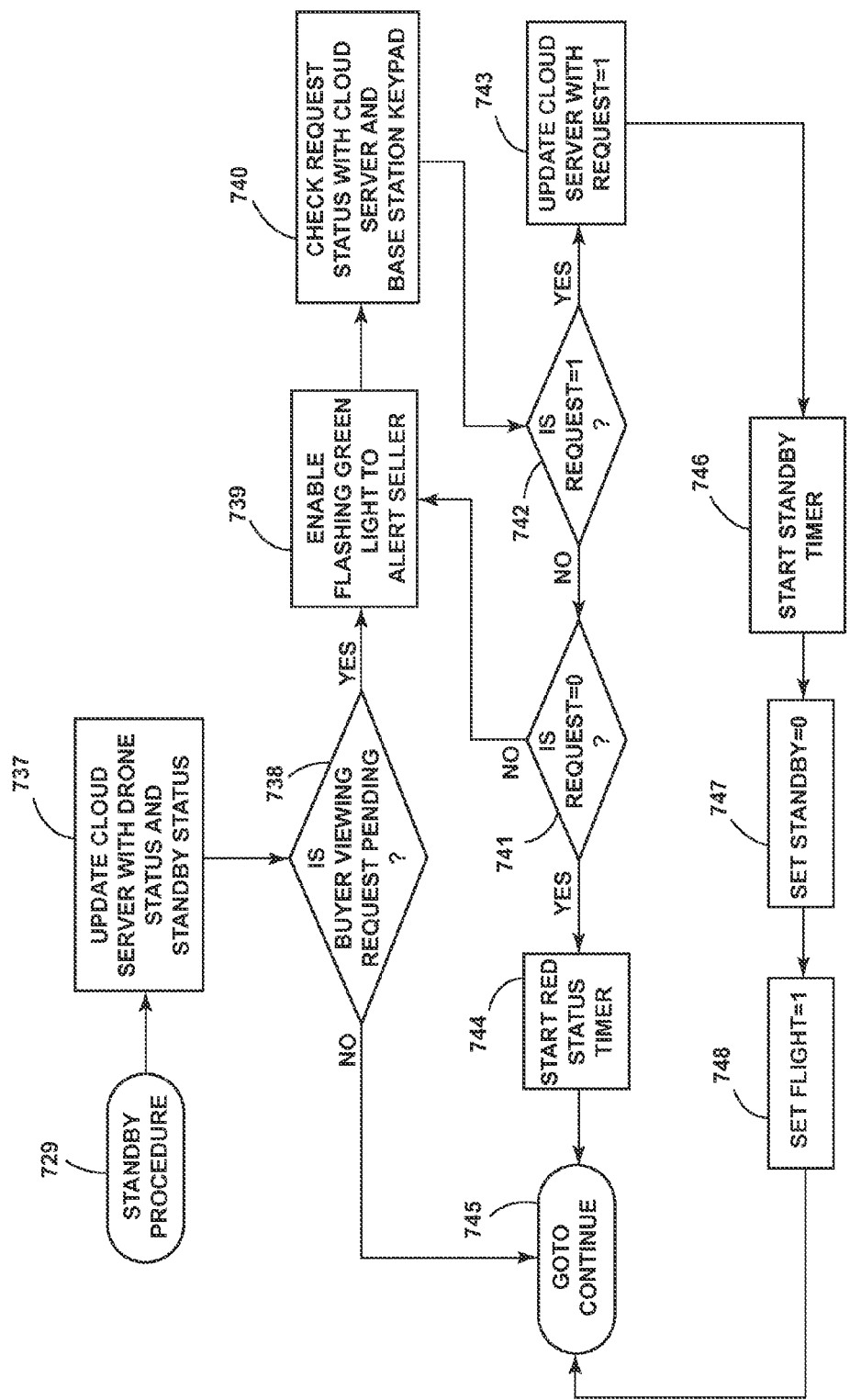
FIG. 18 is a Base Station process flowchart of an illustrative "stand by" procedure for flying an illustrative drone.

In step 717 the Base Station 33 checks to see if the Drone 13 is located on the landing pad and if the battery is charging. If the drone is either in the air or located elsewhere, the process checks for Flight=1 in step 719 which indicates whether the Drone 13 is supposed to be in the air. If the Flight=1 test is negative, it indicates that the Drone 13 should be on its landing pad, and the process continues in steps 722 and 725 where the drone status is set to Red and a flashing Red Light is enabled on the Base Station 33 after which the process goes back to step 715. If at test 719, Flight=1 is affirmative, then the process goes to test 723 where the variable Standby=1 is checked. If the test in step 723 is affirmative, the process goes to step 724 where the Standby Procedure as laid out in FIG. 18 is called. If the test in step 723 is negative and variable Record ProFlight=1 is affirmative, the process will go to the Record Pro Flight procedure in step 727, otherwise the process will proceed at step 728.

If in the test at step 717, it is determined that the Drone 13 is sitting on its landing pad and charging, then in step 718 the Drone 13 status is set to "Green Flashing". Next, in step 720, a determination is made if the drone's current battery charge will sustain at least 20 minutes of flight operation. If this test is affirmative, then Drone 13 status will be set to "Green," and the process proceeds to step 723. If the battery charge level is too low to pass the test in step 720, then the process continues to step 723.

Figure 15A:
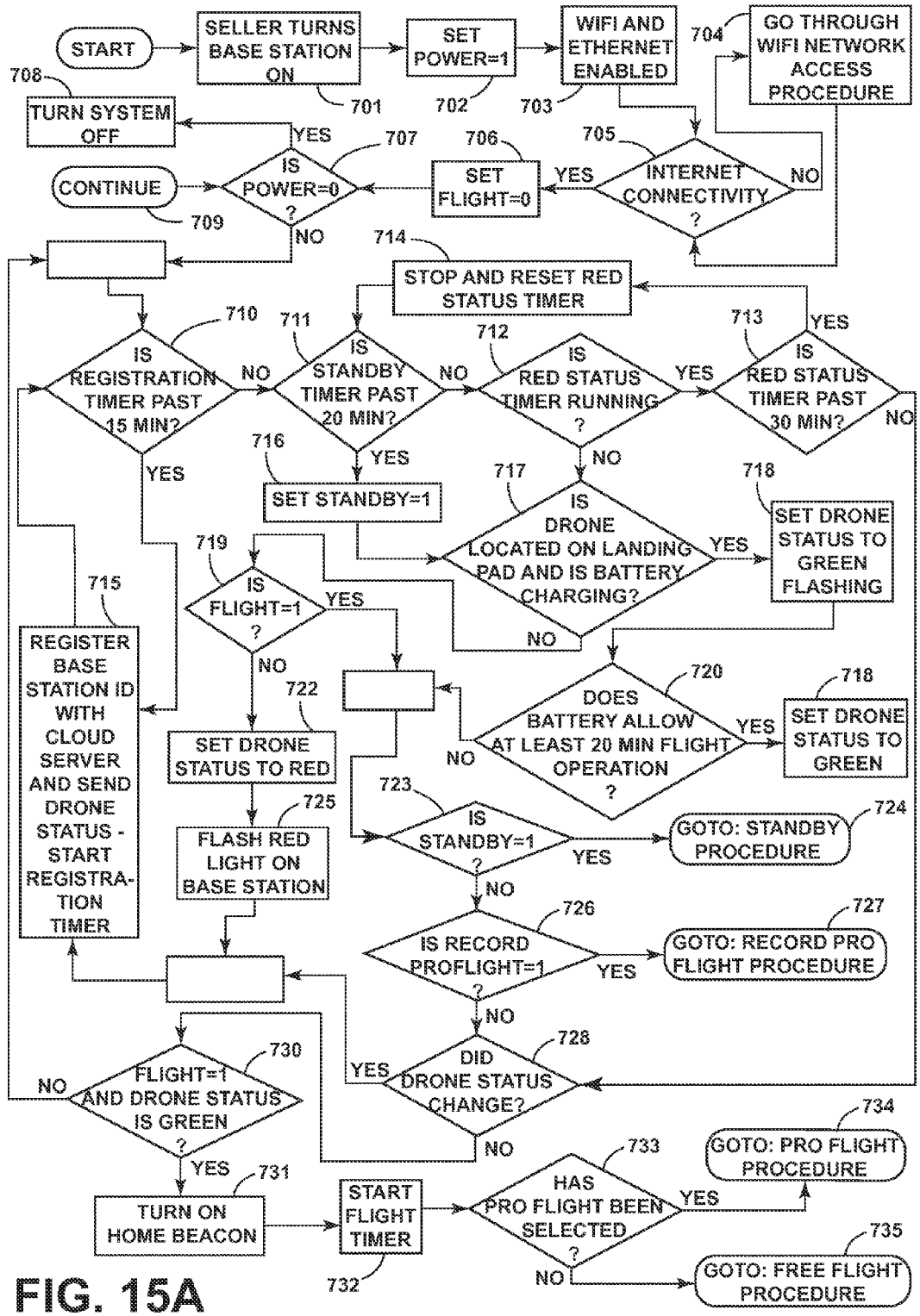
FIG. 15A is a flowchart the Base Station process.
Figure 15B:
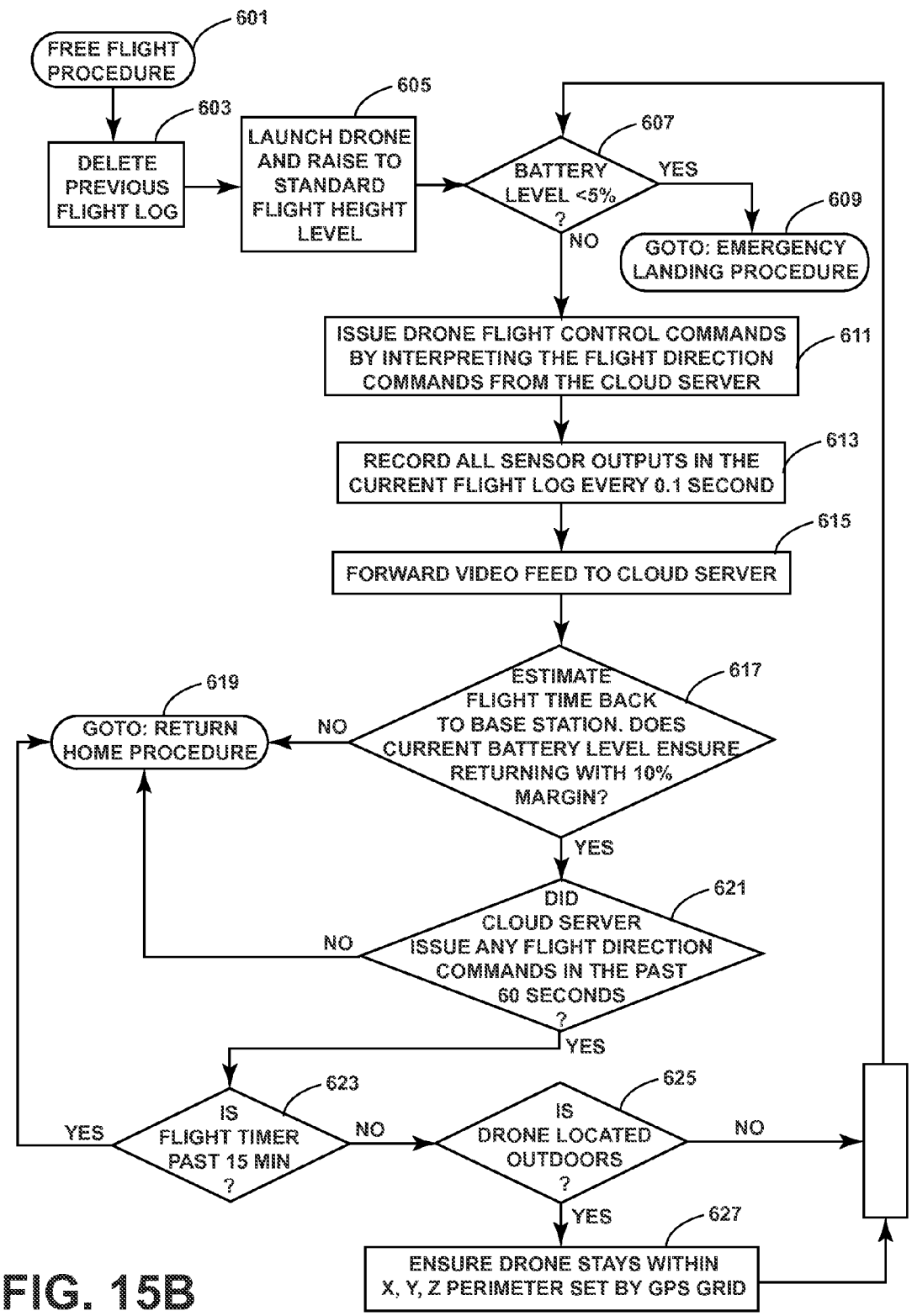
FIG. 15B is a flowchart of the Base Station process of an illustrative "free flight" procedure for flying an illustrative drone.

In the "free flight" procedure 601 of FIG. 15B for flying the Drone 13, any previous flight log is deleted, step 603, and the Drone 13 is launched and raised to standard flight height level, step 605. Test 607 is then performed to determine whether the drone battery level is <5% and, if it is, the emergency landing procedure is implemented at 609. If the battery level is greater than 5%, drone flight control commands are issued from the base station 33 to the Drone 13, step 611, by, for example, interpreting the flight direction commands from the cloud server 41.

Next, in step 613, all drone sensor outputs in the current flight are logged (recorded) every 0.1 second. In step 615, the drone video feed is forwarded to the base station 33 and then to the cloud server 41.

At test 617, the flight time back to the base station 33 is estimated and compared to the current battery level to ensure the Drone 13 can return to the base station 33 with, for example, 10% battery left. If test 617 is not satisfied, the process goes to the return home procedure at 619. If battery power is sufficient, test 621 is performed to determine whether the cloud server 41 issued any flight direction commands in the past 60 seconds. If so, test 623 is performed to determine whether the flight timer is past 15 minutes. If it is, the process goes to the return home procedure at 619. If it is not, the process goes to test 625 to determine whether the Drone 13 is located outdoors. If it is, step 627 is performed to insure that the Drone 13 stays within the X, Y, Z perimeter set by its GPS grid. From step 627, the process returns to test 607, and also returns to test 607 if test 625 establishes that the Drone 13 is not located outdoors.

Figure 21:
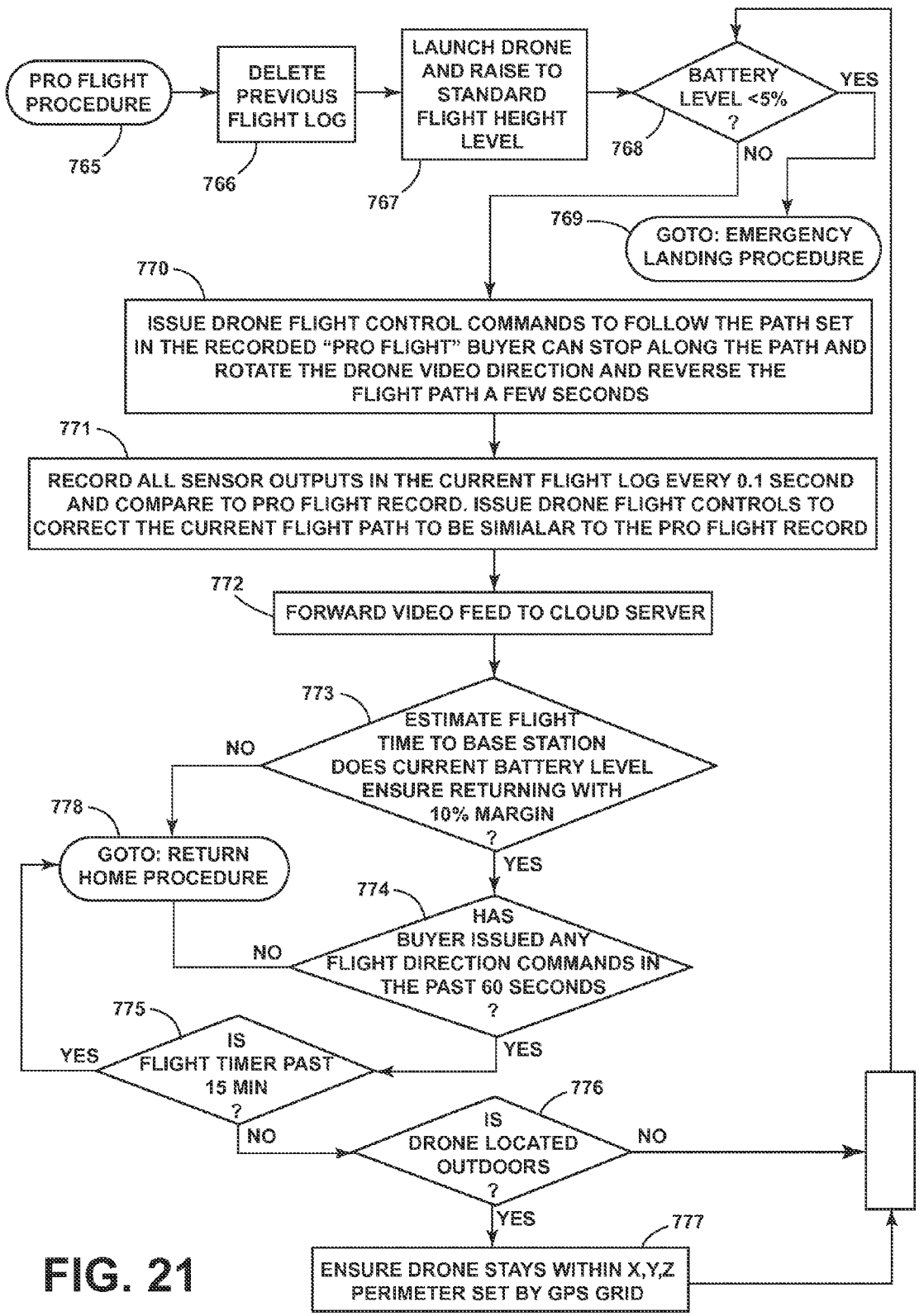
FIG. 21 is a Base Station process flowchart of an illustrative "Pro Flight" procedure for flying an illustrative drone.

The Pro Flight Procedure as called out in step 734 with its process flow steps shown in FIG. 21, steps 765 through 777, is very similar to the Free Flight Procedure as laid out in steps FIG. 15B steps 601 through 627. The main difference is that the Buyer is only able to follow the laid out flight path and cannot deviate from it, which means that the "Up" and "Down" buttons of FIG. 5 are grayed out as well as the "Left" and "Right" buttons. The Buyer can Forward or Reverse along the Pro Flight Path and can to stop and rotate the Drone 13 at any time.

Figure 16:
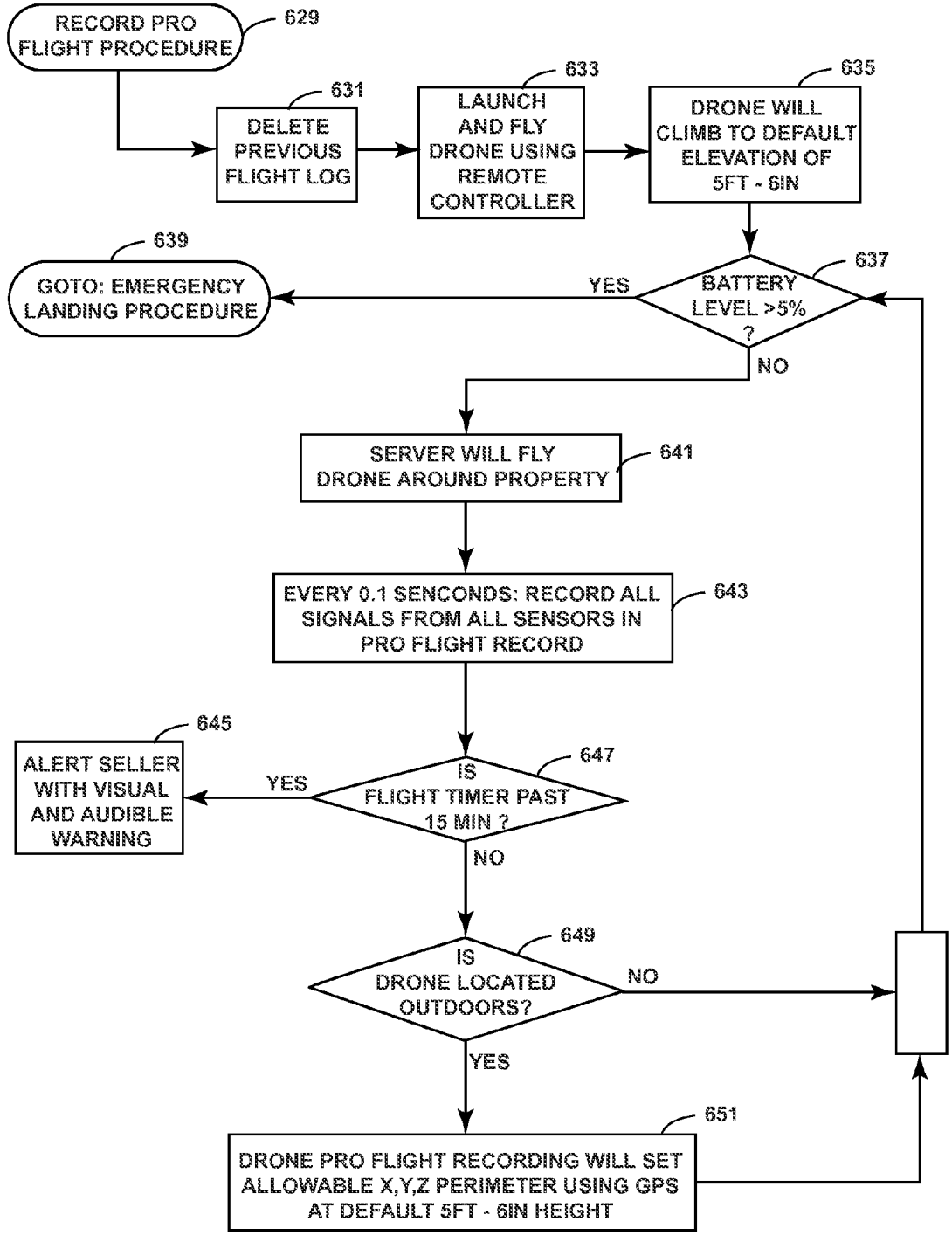
FIG. 16 is a Base Station process flowchart of an illustrative "programmed" procedure for flying an illustrative drone.

In the "record pro flight" procedure 629 of FIG. 16 for flying the drone 13, the previous flight log maintained on base station 33 is deleted at step 631. The seller then launches and flies the Drone 13 using the remote controller 46, step 633. The Drone 13 climbs to a default elevation of 5 ft 6 in at step 635. A drone battery level test is performed at 637, and if the battery level is too low, the emergency landing procedure is implemented at 639. Assuming sufficient battery power; the seller flies the Drone 13 around the property, step 641 and at step 643, all signals from all sensors are recorded every 0.1 second and stored in a pro flight record. At test 645, the flight timer is checked to see if it is past 15 min. If so, the seller is alerted with visual and audible warning at step 645. If the flight time is not past 15 minutes, a test 647 is performed to detect whether the Drone 13 is located outdoors. If it is, the drone pro flight recording will establish an allowable X,Y, Z perimeter for the Drone 13 using the drone GPS at default height of 5 feet 6 inches and then return to test 637. Once the programmed flight path is determined, the Drone 13 can be flown along that path by the seller using a procedure similar to that of FIG. 15.

Figure 17:
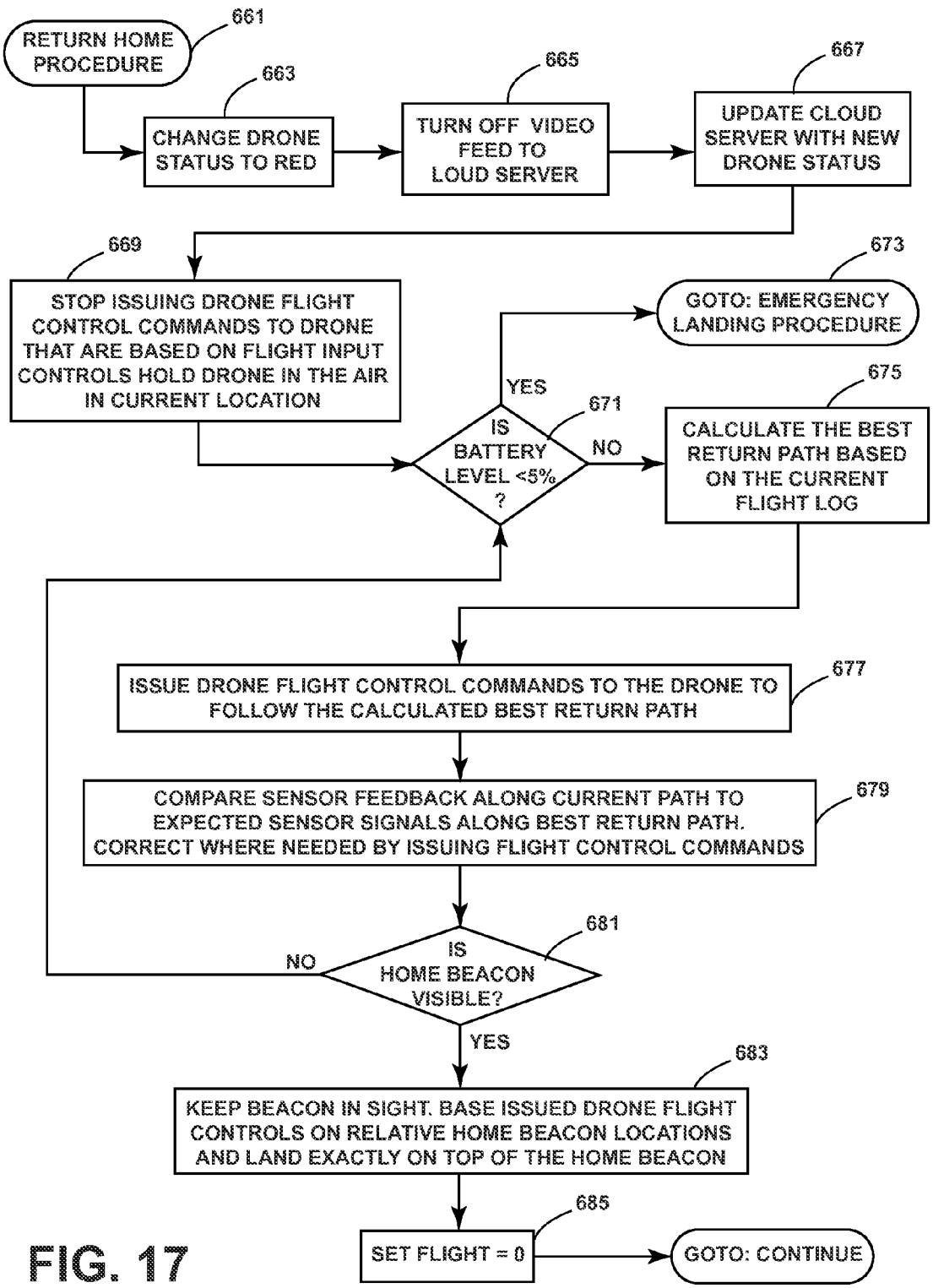
FIG. 17 is a Base Station process flowchart of an illustrative "return home" procedure for flying an illustrative drone.

In the return home procedure 661 of FIG. 17, the drone status is changed to red, step 663. The video feed from the Drone 13 to the base station 33 to the cloud server 41 is turned off, step 665, and the cloud server 41 is updated with a new drone status, step 667. At step 669, the base station 33 stops issuing drone flight control commands to the Drone 13 that are based on flight input controls and holds the Drone 13 in the air at its current location.

At test 671, if the battery level <5%, the emergency landing procedure is entered at 673. If not, the process goes to step 675 to calculate the best return path for the Drone 13 based on the current flight log and calculated by base station 33. At step 677, the base station 33 issues drone flight control commands to the Drone 13 to follow the calculated best return path.

At step 679, the base station 33 compares sensor feedback along the current drone path to expected sensor signals along the best return path and corrects where needed by issuing appropriate flight control commands. Next, a test 681 is conducted to determine if the home beacon is visible. If it is not, the process returns to test 671. If it is, step 683 is performed to keep the beacon in sight. The base station 33 issues drone flight controls based on relative home beacon location and causes the Drone 13 to land exactly on top of the home beacon. Flight status is then set to zero at step 685.

FIG. 18 describes the flow for the Standby Procedure as called out in step 724 discussed above. In Step 737, the Base Station 33 updates the Cloud Server 41 with the Drone 13 status and the current Standby Status. In test 738, the Base Station 33 checks for a Buyer viewing request. If there is such a request, the process goes on to enable a flashing green light to alert the seller of a viewing request. In step 740, the status of this request is checked on the Cloud Server 41 since the Seller may have granted permission through the Cloud Server 41 as opposed to by directly enabling permission on the Base Station 33. The variable "Request" indicates permission or no permission granted. If Request=1, the Seller has granted permission for viewing and in Step 743, the Base Station 33 updates the Cloud Server 41 with the Request=1 status, and starts a Standby Timer, step 746, which, when it reaches 20 minutes, will turn the Base Station 33 back into Standby Mode. In Step 747, the variable Standby=0 is set, which effectively puts the Base Station 33 in standard operational mode for 20 minutes as of that point in time. The Variable Flight=1 is set in step 748, which will ensure that the Drone 13 can take flight.

If in step 742, the test Request=1 is negative, step 741 tests if Request=0 or if it is null. If Request=0, the process in step 744 starts the Red Status Timer which ensures that the Seller will not receive another Buyer Request for at least 30 minutes during steps 744, 745, 709 thru 712 and 713. If the test 41 Request=0 is negative, the process points back to step 739.

To turn off the Base Station 33, the Seller pushes the "Off" button 48, after which the variable Power=0 is set. Now the Base Station 33 enters the "Off Procedure" shown in FIG. 19. In step 752, the process checks if the Drone 13 is in the air, and if it is, the video feed is turned off and the "Return Home Procedure" is started in step 754. If the Drone 13 is not in the air, Step 755 sets the Drone status to "Red", deregisters the Base Station 33 from the Cloud Server 41, and shuts down the Base Station 33. After the Return Home Procedure is completed, the process continues in step 709, and the following test 707 for Power=0 will enable the Base Station 33 to shut down after the Drone 13 returns home.

FIG. 20 shows the Emergency Landing Procedure that the Base Station 33 goes through. If called upon in the main process, this procedure sends an Emergency Landing Command to the Drone 13 in step 761, sets Drone status to "Red", updates the Cloud Server 41 in step 762, and sets Flight=0 in step 763.

Those skilled in the art will appreciate that various adaptations and modifications of the just described illustrative embodiments can be configured without departing from the scope and spirit of the invention. Therefore, it is to be understood that, within the scope of the appended claims, the invention may be practiced other than as specifically described herein.

What is claimed is:

1. Apparatus comprising:
a drone comprising a wireless transceiver, a video camera and a plurality of distance measuring directional sensors;
a server;
a base station within an enclosed seller property switchable on and off by the seller and having a wireless transceiver and a landing pad for the drone, the base station being configured to (a) employ said wireless transceiver to receive buyer-transmitted flight control commands transmitted through the server from a buyer site and (b) control said drone to fly within the enclosed seller property to provide a view of the enclosed property to the buyer at the buyer site in response at least in part to said buyer-transmitted flight control commands;
wherein the drone further comprises a programmed processor or programmed computer programmed to:
establish a wireless connection between the drone and the base station;
respond to a signal from the base station received over the wireless connection to activate the plurality of distance measuring directional sensors and the video camera;
subsequently cause sensor signals from said plurality of distance measuring directional sensors and a video signal feed from said video camera providing a view of said enclosed property to be transmitted to the base station; and
follow flight control commands from the base station received over the wireless connection between the drone and base station, said flight control commands including buyer-transmitted flight control commands, to cause the drone to fly within the enclosed seller property along a path dictated by said flight control commands;
wherein, in a free flight procedure, the drone flight path is determined entirely by buyer-transmitted flight control commands and, in a pre-programmed flight procedure, the drone flight path is determined by pre-programmed flight commands and buyer-transmitted flight control commands;
wherein the server is configured to provide a website to the buyer, the website being responsive to a buyer log-in to serve a plurality of web pages to the buyer (a) showing drone status at the base station, (b) enabling the buyer to select the free flight option for controlling the drone flight path or the pre-programmed flight option for controlling the drone flight path and (c) enabling the buyer to generate said buyer-transmitted flight control commands;
the server being further configured to forward the buyer-transmitted flight control commands to the selected base station; and
wherein the selected base station is configured to forward the video signal feed from the drone to the server and the server is configured to forward the video signal feed to a web page served to the buyer.

2. The apparatus of claim 1 wherein a web page servable to the buyer comprises a plurality of control icons activatable to enable the buyer to fly the drone in a free flight procedure, said icons comprising icons enabling the buyer to cause the drone to move up and down, icons enabling the buyer to cause the drone to move left and right, icons enabling the buyer to cause the drone to circle right and left, and an icon enabling the buyer to cause the drone to stop and hover, said web page further comprising an icon enabling the buyer to activate a procedure to cause the drone to return and land on the base station landing pad.

3. The apparatus of claim 2 wherein a web page servable to the buyer comprises a free flight selection icon enabling the buyer to implement said free flight procedure and one or more flight status icons indicating whether or not the drone is ready to fly.

4. The apparatus of claim 1 wherein said programmed processor or programmed computer is further programmed to execute an obstacle avoidance procedure comprising:
decreasing the drone's speed in x, y, and z directions;
determining whether there is an obstacle in the z axis and, if there is, causing a maneuver to be made to increase the distance to the obstacle in the z axis;
determining whether there is still an obstacle in the drone flight path and increasing the drone speed if there is not;
if an obstacle still in the flight path is detected, determining whether there is an obstacle in the y axis and, if there is, causing a maneuver to be performed to increase the distance to the obstacle in the y axis;
determining whether there is still an obstacle in the drone flight path and if there is not, increasing the drone speed;
if an obstacle still in the flight path is detected, determining whether there is an obstacle in the x axis and, if there is, increasing the distance to the obstacle in x axis; and
determining whether there is still and obstacle in the flight path and if there is not increasing the drone speed.

5. The apparatus of claim 1 wherein said programmed processor or programmed computer is further programmed to execute an emergency landing procedure wherein:
movement of the drone in the x and y axes is stopped and the drone is caused to descend in the z direction;
performing a test to determine if there is an obstacle below the drone that may prevent a flat surface landing;
if there is no such obstacle, causing the descent to continue;

if there is such an obstacle, causing x and y movements of the drone to be made and thereafter determining whether is still an obstacle below the drone which would interfere with a flat surface landing.

6. The apparatus of claim 1 wherein said base station is configured to implement the free flight procedure of the drone by:
  deleting a previous flight log;
  launching the drone to a selected flight height level;
  issuing drone flight control commands to the drone by interpreting flight control commands received from the server;
  recording outputs from said plurality of distance measuring directional sensors;
  receiving the video signal feed from the drone and forwarding it to the server;
  estimating drone flight time back to the base station and determining whether a current battery level is sufficient to allow the drone to return to the base station, and if it is not, implementing a return to home procedure to cause the drone to return to the base station;
  if the battery level is sufficient, determining whether the server has issued any flight control commands during a selected time interval, and if the server has not, implementing a return to home procedure to cause the drone to return to the base station;
  if the current battery level is sufficient and the server has issued flight control commands within the selected time interval, causing the drone to continue to fly in response to flight control commands.

7. The apparatus of claim 1 wherein said base station is configured to implement the programmed flight procedure of the drone by:
  deleting a previous flight log;
  launching the drone to a selected flight height level;
  issuing drone flight control commands to the drone to follow a pre-recorded flight path;
  recording outputs from said directional sensors;
  receiving the video signal feed from the drone and forwarding it to the server;
  enabling buyer-transmitted flight control commands to stop the drone for video viewing of a selected area;
  estimating drone flight time back to the base station and determining whether the current battery level is sufficient to allow the drone to return to the base station, and if it is not, implementing a return to home procedure to cause the drone to return to the base station;
  if the battery level is sufficient, determining whether the buyer has issued any flight control commands during a selected time interval, and if the buyer has not, implementing the return to home procedure;
  if the current battery level is sufficient and the buyer has issued a flight control command within the selected time interval, causing the drone to continue to fly in response to the programmed flight procedure.

8. The apparatus of claim 1 wherein the base station is configured to execute a return home procedure to return the drone to its landing pad, said procedure comprising:
  changing a status of the drone to unavailable and updating the server with the new drone status;
  turning off the video feed to the server;
  discontinuing the issuance of flight commands based on buyer-transmitted flight control commands and holding the drone in its current position; and
  calculating a return flight path employing a current flight log and commanding the drone to follow that path.

9. The apparatus of claim 8 wherein said return to home procedure further comprises generating a home beacon for assisting the drone to return to the base station and issuing the drone flight control commands for returning to the landing pad based on relative home beacon location.

10. The apparatus of claim 8 wherein the return to home procedure further comprises testing the drone battery level and executing an emergency landing procedure if said battery level is below a selected threshold.

11. The apparatus of claim 1 wherein said base station is one of a plurality of base stations, each located in a different enclosed seller property and made available by said website for selection for drone inspection by said buyer.

12. Apparatus comprising:
  a drone comprising a wireless transceiver, a video camera and a plurality of distance measuring directional sensors;
  a server;
  a base station within an enclosed seller property switchable on and off by the seller and having a wireless transceiver and a landing pad for the drone, the base station being configured to (a) employ said wireless transceiver to receive buyer-transmitted flight control commands transmitted through the server from a buyer site and (b) control said drone to fly within the enclosed seller property to provide a view of the enclosed property to the buyer at the buyer site in response at least in part to said buyer-transmitted flight control commands;
  wherein the drone further comprises a programmed processor or programmed computer programmed to:
    establish a wireless connection between the drone and the base station;
    respond to a signal from the base station received over the wireless connection to activate the plurality of distance measuring directional sensors and the video camera;
    subsequently cause sensor signals from said plurality of distance measuring directional sensors and a video signal feed from said video camera providing a view of said enclosed property to be transmitted to the base station; and
    follow the buyer-transmitted flight control commands from the base station received over the wireless connection between the drone and base station to cause the drone to fly within the enclosed seller property along a path dictated by said buyer-transmitted flight control commands;
  wherein the server is configured to provide a website to the buyer, the website being responsive to a buyer log-in to serve a plurality of web pages to the buyer showing drone status at the base station and enabling the buyer to generate said buyer-transmitted flight control command signals;
  the server being further configured to forward the buyer-transmitted flight control commands to the base station; and
  wherein the base station is configured to forward the video signal feed from the drone to the server and the server is configured to forward the video signal feed to a web page served to the buyer.

13. The apparatus of claim 12 wherein said base station is configured to implement a free flight procedure of the drone by:
  deleting a previous flight log;
  launching the drone to a selected flight height level;

issuing drone flight control commands to the drone by interpreting the buyer-transmitted flight control commands received from the server;

recording outputs from said directional sensors;

receiving the video signal feed from the drone and forwarding it to the server;

estimating drone flight time back to the base station and determining whether a current battery level is sufficient to allow the drone to return to the base station, and, if it is not, implementing a return to home procedure to cause the drone to return to the base station;

if the battery level is sufficient, determining whether the server has issued any flight control commands during a selected time interval, and, if the server has not, implementing the return to home procedure;

if the current battery level is sufficient and the server has issued flight control commands within the selected time interval, causing the drone to continue to fly in response to the buyer-transmitted flight control commands.

14. Apparatus comprising:

a drone comprising a wireless transceiver, a video camera and a plurality of distance measuring directional sensors;

a server;

a base station within an enclosed seller property switchable on and off by the seller and having a wireless transceiver and a landing pad for the drone, the base station being configured to (a) employ said wireless transceiver to receive buyer-transmitted flight control commands transmitted through the server from a buyer site and (b) control said drone to fly within the enclosed seller property to provide a view of the enclosed property to the buyer at the buyer site in response at least in part to said buyer-transmitted flight control commands;

wherein the drone further comprises a programmed processor or programmed computer programmed to:

establish a wireless connection between the drone and the base station;

respond to a signal from the base station received over the wireless connection to activate the plurality of distance measuring directional sensors and the video camera;

subsequently cause sensor signals from said plurality of distance measuring directional sensors and a video signal feed from said video camera providing a view of said enclosed property to be transmitted to the base station; and follow the buyer-transmitted flight control commands along with pre-programmed flight control commands from the base station received over the wireless connection between the drone and base station to cause the drone to fly within the enclosed seller property along a path dictated by said buyer-transmitted and pre-programmed flight control commands;

wherein the server is configured to provide a website to the buyer, the website being responsive to a buyer log-in to serve a plurality of web pages to the buyer showing drone status at the base station and enabling the buyer to generate said buyer-transmitted flight control commands;

the server being further configured to forward the buyer-transmitted flight control commands to the base station; and wherein the base station is configured to forward the video signal feed from the drone to the server and the server is configured to forward the video signal feed to a web page served to the buyer.

15. The apparatus of claim 14 wherein said base station is configured to implement a flight procedure of the drone by:

deleting a previous flight log;

launching the drone to a selected flight height level;

issuing flight control commands to the drone to follow a pre-recorded flight path;

recording outputs from said directional sensors;

receiving the video signal feed from the drone and forwarding it to the server;

enabling buyer-transmitted flight control commands to cause the drone to stop and hover for video viewing of a selected area;

estimating drone flight time back to the base station and determining whether a current battery level is sufficient to allow the drone to return to the base station, and, if it is not, implementing a return to home procedure to cause the drone to return to the base station;

if the battery level is sufficient, determining whether the buyer has issued any flight control commands during a selected time interval, and if it the buyer has not, implementing the return to home procedure;

if the current battery level is sufficient and the buyer has issued a flight control command within the selected time interval, causing the drone to continue to fly in response to the flight procedure.

16. Apparatus comprising:

a drone comprising a wireless transceiver, a video camera and a plurality of distance measuring directional sensors;

a server;

a base station within an enclosed seller property switchable on and off by the seller and having a wireless transceiver and a landing pad for the drone, the base station being configured to (a) employ said wireless transceiver to receive buyer-transmitted flight control commands transmitted through the server from a buyer site and (b) control said drone to fly within the enclosed seller property to provide a view of the enclosed property to the buyer at the buyer site in response at least in part to said buyer-transmitted flight control commands;

wherein the drone further comprises a programmed processor or programmed computer programmed to:

establish a wireless connection between the drone and the base station;

respond to a signal from the base station received over the wireless connection to activate the plurality of distance measuring directional sensors and the video camera;

subsequently cause sensor signals from said plurality of distance measuring directional sensors and a video signal feed from said video camera providing a view of said enclosed property to be transmitted to the base station; and follow flight control commands from the base station received over the wireless connection between the drone and base station, said flight control commands including said buyer-transmitted flight control commands, to cause the drone to fly within the enclosed seller property along a path dictated by said buyer-transmitted flight control commands;

wherein, in a free flight procedure, the drone flight path is determined entirely by buyer-transmitted flight control commands and, in a pre-programmed flight procedure, the drone flight path is determined by pre-programmed flight commands and buyer-transmitted flight control commands;

wherein the server is configured to provide a website to the buyer, the website being responsive to a buyer log-in to serve a plurality of web pages to the buyer showing drone status at the base station, enabling the buyer to select the free flight procedure for controlling the drone flight path or the pre-programmed flight procedure for controlling the drone flight path and enabling the buyer to generate said buyer-transmitted flight control commands;

the server being further configured to forward the buyer-transmitted flight control commands to the selected base station; and wherein the base station is configured to forward the video signal feed from the drone to the server and the server is configured to forward the video signal feed to a web page served to the buyer;

wherein said base station is configured to implement either the pre-programmed flight procedure or the free flight procedure of the drone by:
deleting a previous flight log;
launching the drone to a selected flight height level;
issuing drone flight control commands to the drone;
recording outputs from said directional sensors;
receiving the video signal feed from the drone and forwarding it to the server;
causing the drone to stop and hover for video viewing of a selected area in response to a buyer-transmitted flight control command
estimating drone flight time back to the base station and determining whether a current battery level is sufficient to allow the drone to return to the base station, and if it is not, implementing a return to home procedure to cause the drone to return to the base station;
in the pre-programmed flight procedure, if the current battery level is determined to be sufficient, determining whether the buyer has issued any flight control commands during a selected time interval, and if it the buyer has not, implementing the return to home procedure;
in the pre-programmed flight procedure, if the current battery level is determined to be sufficient and the buyer has issued a flight control command within the selected time interval, causing the drone to continue to fly according to the pre-programmed flight procedure
in the free flight procedure, if the current battery level is determined to be sufficient, determining whether the server has issued a flight control command during a selected time interval, and if the server has not, implementing the return to home procedure;
in the free flight procedure, if the current battery level is determined to be sufficient and the server has issued a flight control command within the selected time interval, causing the drone to continue to fly in response to the buyer-transmitted flight control commands;

wherein a web page servable to the buyer comprises a plurality of control icons activatable to enable the buyer to fly the drone in a free flight procedure, said icons comprising icons enabling the buyer to cause the drone to move up and down, icons enabling the buyer to cause the drone to move left and right, icons enabling the buyer to cause the drone to circle right and left, and an icon enabling the buyer to cause the drone to stop and hover, said web page further comprising an icon enabling the buyer to activate a procedure to cause the drone to return and land on the base station landing pad;

wherein a web page servable to the buyer comprises a free flight selection icon enabling the buyer to implement said free flight procedure and one or more flight status icons indicating whether or not the drone is ready to fly;

wherein said programmed processor or programmed computer is further programmed to execute and obstacle avoidance procedure comprising:
decreasing drone speed in x, y, and z directions;
determining whether there is an obstacle in the z axis and if so causing a maneuver to be made to increase the distance to the obstacle in the z axis;
determining whether there is still an obstacle in the flight path and increasing the drone speed if there is not;
if an obstacle still in the flight path is detected, determining whether there is an obstacle in the y axis and, if there is, causing a maneuver to be performed to increase the distance to the obstacle in the y axis;
determining whether there is still an obstacle in the flight path and if there is not, increasing the drone speed;
if an obstacle still in the flight path is detected, determining whether there is an obstacle in the x axis and if there is increasing the distance to the obstacle in x axis;
determining whether there is still and obstacle in the flight path and if there is not increasing the drone speed wherein said programmed processor or programmed computer is further programmed to execute an emergency landing procedure by:
stopping movement of the drone in the x and y axes and causing the drone to descend in the z direction;
performing a test to determine if there is an obstacle below the drone that may prevent a flat surface landing;
if there is no such obstacle, causing the drone to continue to descend;
if there is such an obstacle, causing x and y movements of the drone to be made and thereafter determining whether is still an obstacle below the drone which would interfere with a flat surface landing.

* * * * *